(12) United States Patent
Stark et al.

(10) Patent No.: US 9,042,252 B2
(45) Date of Patent: May 26, 2015

(54) INTER-PACKET INTERVAL PREDICTION LEARNING ALGORITHM

(71) Applicants: Gavin J. Stark, Cambridge (GB); Nicolaas J. Viljoen, Cambridge (GB); Niel Viljoen, Cambridge (GB)

(72) Inventors: Gavin J. Stark, Cambridge (GB); Nicolaas J. Viljoen, Cambridge (GB); Niel Viljoen, Cambridge (GB)

(73) Assignee: NETRONOME SYSTEMS, INCORPORATED, Santa Clara, CA (US)

( * ) Notice: Subject to any disclaimer, the term of this patent is extended or adjusted under 35 U.S.C. 154(b) by 266 days.

(21) Appl. No.: 13/675,620

(22) Filed: Nov. 13, 2012

(65) Prior Publication Data
US 2014/0133320 A1    May 15, 2014

(51) Int. Cl.
*H04L 12/28* (2006.01)
*H04L 29/06* (2006.01)
*H04J 3/00* (2006.01)

(52) U.S. Cl.
CPC ............. *H04L 29/06* (2013.01); *H04L 69/22* (2013.01); *H04L 69/28* (2013.01)

(58) Field of Classification Search
CPC ......... H04B 3/23; H04B 3/234; H04J 3/0632; H04J 3/0638; H04L 12/2801; H04L 12/5692; H04L 12/66; H04L 29/06027; H04L 65/1069; H04L 69/22; H04L 29/06; H04L 69/28; H04M 7/006; H04M 7/125; H04M 7/0087; H04N 21/2383; H04N 21/4382; H04N 7/10
USPC ............................... 370/230–516; 726/11–25
See application file for complete search history.

(56) References Cited

U.S. PATENT DOCUMENTS

| | | | |
|---|---|---|---|
| 7,519,738 B2* | 4/2009 | Forsberg | 709/245 |
| 7,822,073 B2* | 10/2010 | Wang et al. | 370/516 |
| 7,882,554 B2* | 2/2011 | Kay | 726/11 |
| 7,890,991 B2* | 2/2011 | Kay | 726/1 |
| 7,921,686 B2* | 4/2011 | Bagepalli et al. | 70/223 |
| 7,933,295 B2* | 4/2011 | Thi et al. | 370/493 |
| 7,996,894 B1* | 8/2011 | Chen et al. | 726/22 |
| 8,005,083 B1* | 8/2011 | Diep | 370/389 |
| 8,023,425 B2* | 9/2011 | Raleigh | 370/252 |
| 8,024,799 B2* | 9/2011 | Kay | 726/22 |
| 8,229,812 B2* | 7/2012 | Raleigh | 705/34 |
| 8,250,207 B2* | 8/2012 | Raleigh | 709/224 |
| 8,270,310 B2* | 9/2012 | Raleigh | 370/252 |

(Continued)

Primary Examiner — Venkatesh Haliyur
(74) Attorney, Agent, or Firm — Imperium Patent Works; T. Lester Wallace; Mark D. Marrello

(57) ABSTRACT

An appliance receives packets that are part of a flow pair, each packet sharing an application protocol. The appliance determines the application protocol of the packets by performing deep packet inspection (DPI) on the packets. Packet sizes are measured and converted into packet size states. Packet size states, packet sequence numbers, and packet flow directions are used to create an application protocol estimation table (APET). The APET is used during normal operation to estimate the application protocol of a flow pair without performing time consuming DPI. The appliance then determines inter-packet intervals between received packets. The inter-packet intervals are converted into inter-packet interval states. The inter-packet interval states and packet sequence numbers are used to create an inter-packet interval prediction table. The appliance then stores an inter-packet interval prediction table for each application protocol. The inter-packet interval prediction table is used during operation to predict the inter-packet interval between packets.

16 Claims, 21 Drawing Sheets

APPLIANCE WITH PREDICTIVE CACHING

(56) References Cited

U.S. PATENT DOCUMENTS

| | | | | |
|---|---|---|---|---|
| 8,270,952 B2 * | 9/2012 | Raleigh | ............... | 455/414.1 |
| 8,296,846 B2 * | 10/2012 | Kay | ............... | 726/22 |
| 8,321,526 B2 * | 11/2012 | Raleigh | ............... | 709/217 |
| 8,326,958 B1 * | 12/2012 | Raleigh | ............... | 709/223 |
| 8,331,901 B2 * | 12/2012 | Raleigh | ............... | 455/405 |
| 8,346,918 B2 * | 1/2013 | Kay | ............... | 709/224 |
| 8,351,898 B2 * | 1/2013 | Raleigh | ............... | 455/405 |
| 8,355,337 B2 * | 1/2013 | Raleigh | ............... | 370/252 |
| 8,385,916 B2 * | 2/2013 | Raleigh | ............... | 455/432.1 |
| 8,396,458 B2 * | 3/2013 | Raleigh | ............... | 455/414.1 |
| 8,406,733 B2 * | 3/2013 | Raleigh | ............... | 455/407 |
| 8,437,271 B2 * | 5/2013 | Raleigh | ............... | 370/252 |
| 8,441,989 B2 * | 5/2013 | Raleigh | ............... | 370/328 |
| 8,443,069 B2 * | 5/2013 | Bagepalli et al. | ............... | 709/223 |
| 8,467,312 B2 * | 6/2013 | Raleigh | ............... | 370/252 |
| 8,478,667 B2 * | 7/2013 | Raleigh | ............... | 705/34 |
| 8,516,552 B2 * | 8/2013 | Raleigh | ............... | 726/2 |
| 8,531,986 B2 * | 9/2013 | Raleigh | ............... | 370/252 |
| 8,547,872 B2 * | 10/2013 | Raleigh | ............... | 370/252 |
| 8,582,577 B2 * | 11/2013 | Thi et al. | ............... | 370/392 |
| 8,583,781 B2 * | 11/2013 | Raleigh | ............... | 709/224 |
| 8,588,110 B2 * | 11/2013 | Raleigh | ............... | 370/259 |
| 8,588,238 B2 * | 11/2013 | Weill et al. | ............... | 370/395.53 |
| 8,589,541 B2 * | 11/2013 | Raleigh et al. | ............... | 709/224 |
| 8,606,911 B2 * | 12/2013 | Raleigh et al. | ............... | 709/224 |
| 8,612,612 B1 * | 12/2013 | Dukes et al. | ............... | 709/228 |
| 8,630,192 B2 * | 1/2014 | Raleigh | ............... | 370/252 |
| 8,665,868 B2 * | 3/2014 | Kay | ............... | 370/389 |
| 8,666,364 B2 * | 3/2014 | Raleigh | ............... | 455/406 |
| 8,675,507 B2 * | 3/2014 | Raleigh | ............... | 370/252 |
| 8,681,648 B2 * | 3/2014 | Famolari et al. | ............... | 370/252 |
| 8,688,099 B2 * | 4/2014 | Raleigh | ............... | 455/418 |
| 8,693,323 B1 * | 4/2014 | McDysan | ............... | 370/230 |
| 8,713,630 B2 * | 4/2014 | Raleigh | ............... | 726/1 |
| 8,762,501 B2 * | 6/2014 | Kempf et al. | ............... | 709/220 |
| 2005/0111362 A1 * | 5/2005 | Freytsis et al. | ............... | 370/230 |
| 2007/0121615 A1 * | 5/2007 | Weill et al. | ............... | 370/389 |
| 2008/0144494 A1 * | 6/2008 | Casey | ............... | 370/230 |
| 2008/0144602 A1 * | 6/2008 | Casey | ............... | 370/352 |
| 2008/0144615 A1 * | 6/2008 | Casey | ............... | 370/389 |
| 2010/0074125 A1 * | 3/2010 | Chandra et al. | ............... | 370/252 |
| 2011/0235509 A1 * | 9/2011 | Szymanski | ............... | 370/230 |
| 2011/0314145 A1 * | 12/2011 | Raleigh et al. | ............... | 709/224 |
| 2012/0215911 A1 * | 8/2012 | Raleigh et al. | ............... | 709/224 |
| 2012/0221955 A1 * | 8/2012 | Raleigh et al. | ............... | 715/736 |
| 2012/0324091 A9 * | 12/2012 | Raleigh et al. | ............... | 709/224 |
| 2014/0126367 A1 * | 5/2014 | Stark et al. | ............... | 370/235 |
| 2014/0133320 A1 * | 5/2014 | Stark et al. | ............... | 370/252 |
| 2014/0136683 A1 * | 5/2014 | Stark et al. | ............... | 709/224 |
| 2014/0233394 A1 * | 8/2014 | Viljoen et al. | ............... | 370/236.2 |
| 2014/0236873 A1 * | 8/2014 | Viljoen et al. | ............... | 706/12 |

* cited by examiner

FLOW PROCESSING DEVICE

COMMUNICATION SYSTEM

APPLIANCE WITH PREDICTIVE CACHING

ME ISLAND

MU ISLAND

PREDICTIVE CACHING OVERVIEW FLOWCHART

PREDICTIVE CACHING LEARNING PHASE FLOWCHART

PACKET FLOW DIAGRAM

LEARNING PHASE PACKET DIAGRAM

| FLOW ID | APPLICATION PROTOCOL | PACKET NUMBER | | | | | | | |
|---|---|---|---|---|---|---|---|---|---|
| | | 1 | 2 | 3 | 4 | 5 | 6 | 7 | |
| 1 | HTTP | 32 B S→C | 32 B C→S | 128 B C→S | 32 B C→S | 32 B C→S | 128 B C→S | 32 B S→C | ⎫ |
| 2 | IMAP | 16 B C→S | 32 B S→C | 168 B S→C | 16 B S→C | 32 B S→C | 168 B S→C | 16 B C→S | ⎬ |
| 3 | SMTP | 32 B S→C | 32 B C→S | 168 B S→C | 32 B C→S | 32 B S→C | 168 B C→S | 32 B S→C | |
| 4 | HTTPS | 16 B C→S | 32 B S→C | 480 B C→S | 16 B C→S | 32 B S→C | 480 B C→S | 16 B C→S | PACKET SIZE & PACKET DIRECTION |
| 5 | HTTP | 38 B S→C | 26 B C→S | 134 B C→S | 40 B C→S | 30 B C→S | 116 B C→S | 30 B S→C | |
| 6 | IMAP | 20 B C→S | 38 B S→C | 180 B S→C | 20 B S→C | 38 B S→C | 180 B S→C | 20 B C→S | |
| 7 | SMTP | 30 B S→C | 30 B C→S | 160 B S→C | 30 B C→S | 30 B S→C | 160 B C→S | 30 B S→C | |
| 8 | HTTPS | 28 B C→S | 40 B S→C | 390 B C→S | 29 B C→S | 40 B S→C | 390 B C→S | 28 B C→S | ⎭ |
| ⋮ | ⋮ | ⋮ | ⋮ | ⋮ | ⋮ | ⋮ | ⋮ | ⋮ | |

FLOW ID REPRESENTS A SPECIFIC COMBINATION OF SOURCE IP, DESTINATION IP, SOURCE PORT, AND DESTINATION PORT ADDRESSES.

TABLE OF APPLICATION PROTOCOL LEARNING DATA

FIG. 11

| PACKET SIZE STATE | PACKET SIZE (PS) RANGE |
|---|---|
| 1 | PS < 100 BYTES (CLIENT TO SERVER) |
| 2 | 100 BYTES ≤ PS < MAX PS (CLIENT TO SERVER) |
| 3 | MAX PS SIZE ≤ PS (CLIENT TO SERVER) |
| 4 | PS < 100 BYTES (SERVER TO CLIENT) |
| 5 | 100 BYTES ≤ PS < MAX PS (SERVER TO CLIENT) |
| 6 | MAX PS SIZE ≤ PS (SERVER TO CLIENT) |

TABLE OF DEFINED PACKET SIZE STATES

FIG. 12

| FLOW ID | APPLICATION PROTOCOL | PACKET NUMBER | | | | | | |
|---|---|---|---|---|---|---|---|---|
| | | 1 | 2 | 3 | 4 | 5 | 6 | 7 |
| 1 | HTTP | PSS=4 | PSS=1 | PSS=2 | PSS=1 | PSS=1 | PSS=2 | PSS=4 |
| 2 | IMAP | PSS=1 | PSS=4 | PSS=5 | PSS=4 | PSS=4 | PSS=5 | PSS=1 |
| 3 | SMTP | PSS=4 | PSS=1 | PSS=5 | PSS=1 | PSS=4 | PSS=2 | PSS=4 |
| 4 | HTTPS | PSS=1 | PSS=4 | PSS=3 | PSS=1 | PSS=4 | PSS=3 | PSS=1 |
| 5 | HTTP | PSS=4 | PSS=1 | PSS=2 | PSS=1 | PSS=1 | PSS=2 | PSS=4 |
| 6 | IMAP | PSS=1 | PSS=4 | PSS=5 | PSS=4 | PSS=4 | PSS=5 | PSS=1 |
| 7 | SMTP | PSS=4 | PSS=1 | PSS=5 | PSS=1 | PSS=4 | PSS=2 | PSS=4 |
| 8 | HTTPS | PSS=1 | PSS=4 | PSS=3 | PSS=1 | PSS=4 | PSS=3 | PSS=1 |
| ⋮ | ⋮ | ⋮ | ⋮ | ⋮ | ⋮ | ⋮ | ⋮ | ⋮ |

(Packet columns 1–7 form the PACKET SIZE STATE.)

FLOW ID REPRESENTS A SPECIFIC COMBINATION OF SOURCE IP, DESTINATION IP, SOURCE PORT, AND DESTINATION PORT ADDRESSES.

TABLE OF APPLICATION PROTOCOL LEARNING DATA
CONVERTED TO PACKET SIZE STATE INFORMATION

FIG. 13

PROTOCOL = HTML

| PACKET SIZE STATE (PSS) | PACKET #1 | PACKET #2 | PACKET #3 | PACKET #4 | PACKET #5 | PACKET #6 | PACKET #7 |
|---|---|---|---|---|---|---|---|
| 1 | % | % | % | % | % | % | % |
| 2 | % | % | % | % | % | % | % |
| 3 | % | % | % | % | % | % | % |
| 4 | % | % | % | % | % | % | % |
| 5 | % | % | % | % | % | % | % |
| 6 | % | % | % | % | % | % | % |

% = PROBABILITY THAT THE PACKET IS A HTML PROTOCOL BASED SOLELY ON CURRENT PACKET SIZE STATE.

TABLE OF CURRENT PACKET SIZE STATE
APPLICATION PROTOCOL PROBABILITIES

FIG. 14

APPLICATION PROTOCOL = HTML (A SEPARATE TABLE IS GENERATED FOR EACH PROTOCOL)

| PSS (PACKET N-1) | PSS (PACKET N) | PSST #1 → #2 | PSST #2 → #3 | PSST #3 → #4 | PSST #4 → #5 | PSST #5 → #6 | PSST #6 → #7 |
|---|---|---|---|---|---|---|---|
| 1 | 1 (EXAMPLE A) | (#) | # | # | # | # | # |
| | 2 | # | # | # | # | # | # |
| | 3 | # | # | # | # | # | # |
| | 4 | # | # | # | # | # | # |
| | 5 | # | # | # | # | # | # |
| | 6 | # | # | # | # | # | # |
| 2 | 1 | # | # | # | # | # | # |
| | 2 | # | # | # | # | # | # |
| | 3 | # | # | # | # | # | # |
| | 4 | # | # | # | # | # | # |
| | 5 | # | # | # | # | # | # |
| | 6 (EXAMPLE B) | # | # | (#) | # | # | # |
| 3 | 1 | # | # | # | # | # | # |
| | 2 | # | # | # | # | # | # |
| | 3 | # | # | # | # | # | # |
| | 4 | # | # | # | # | # | # |
| | 5 | # | # | # | # | # | # |
| | 6 | # | # | # | # | # | # |
| 4 | 1 | # | # | # | # | # | # |
| | 2 | # | # | # | # | # | # |
| | 3 | # | # | # | # | # | # |
| | 4 | # | # | # | # | # | # |
| | 5 | # | # | # | # | # | # |
| | 6 | # | # | # | # | # | # |
| 5 | 1 | # | # | # | # | # | # |
| | 2 | # | # | # | # | # | # |
| | 3 | # | # | # | # | # | # |
| | 4 | # | # | # | # | # | # |
| | 5 | # | # | # | # | # | # |
| | 6 | # | # | # | # | # | # |
| 6 | 1 | # | # | # | # | # | # |
| | 2 | # | # | # | # | # | # |
| | 3 | # | # | # | # | # | # |
| | 4 | # | # | # | # | # | # |
| | 5 | # | # | # | # | # | # |
| | 6 | # | # | # | # | # | # |

# = PATH COUNT (TOTAL NUMBER OF STATE TRANSITIONS THAT FOLLOW THE N-1 TO N PACKET SIZE STATE PATH).

APPLICATION PROTOCOL COUNT TABLE

FIG. 15

| PSS (PACKET N-1) | PSS (PACKET N) | PSST #1 → #2 | PSST #2 → #3 | PSST #3 → #4 | PSST #4 → #5 | PSST #5 → #6 | PSST #6 → #7 |
|---|---|---|---|---|---|---|---|
| 1 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 2 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 3 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 4 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 5 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 6 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |

MLAP = MOST LIKELY APPLICATION PROTOCOL.
% = PROBABILITY THAT THE PACKET N IS THE MOST LIKELY APPLICATION PROTOCOL.

APPLICATION PROTOCOL ESTIMATION TABLE

FIG. 16

| FLOW ID | APPLICATION PROTOCOL | PACKET NUMBER | | | | | | |
|---|---|---|---|---|---|---|---|---|
| | | 8 | 9 | 10 | ... | 48 | 49 | 50 |
| 1 | HTTP | PAT | PAT | PAT | ... | PAT | PAT | PAT |
| 2 | IMAP | PAT | PAT | PAT | ... | PAT | PAT | PAT |
| 3 | SMTP | PAT | PAT | PAT | ... | PAT | PAT | PAT |
| 4 | HTTPS | PAT | PAT | PAT | ... | PAT | PAT | PAT |
| 5 | HTTP | PAT | PAT | PAT | ... | PAT | PAT | PAT |
| 6 | IMAP | PAT | PAT | PAT | ... | PAT | PAT | PAT |
| 7 | SMTP | PAT | PAT | PAT | ... | PAT | PAT | PAT |
| 8 | HTTPS | PAT | PAT | PAT | ... | PAT | PAT | PAT |
| ⋮ | ⋮ | ⋮ | ⋮ | ⋮ | ⋮ | ⋮ | ⋮ | ⋮ |

} PACKET ARRIVAL TIME

PAT = PACKET ARRIVAL TIME.

TABLE OF PACKET ARRIVAL TIME DATA

FIG. 17

| FLOW ID | APPLICATION PROTOCOL | INTER-PACKET INTERVAL PACKET (N-1) TO PACKET (N) | | | | | | |
|---|---|---|---|---|---|---|---|---|
| | | 8→9 | 9→10 | 10→11 | ... | 47→48 | 48→49 | 49→50 |
| 1 | HTTP | .5NS | IPI | 90NS | ... | IPI | IPI | IPI |
| 2 | IMAP | IPI | IPI | IPI | ... | IPI | IPI | IPI |
| 3 | SMTP | IPI | IPI | IPI | ... | IPI | IPI | IPI |
| 4 | HTTPS | IPI | IPI | IPI | ... | IPI | IPI | IPI |
| 5 | HTTP | IPI | IPI | IPI | ... | IPI | IPI | IPI |
| 6 | IMAP | IPI | IPI | IPI | ... | IPI | IPI | IPI |
| 7 | SMTP | IPI | IPI | IPI | ... | IPI | IPI | IPI |
| 8 | HTTPS | IPI | IPI | IPI | ... | IPI | IPI | IPI |
| ⋮ | ⋮ | ⋮ | ⋮ | ⋮ | ⋮ | ⋮ | ⋮ | ⋮ |

} INTER-PACKET INTERVAL

IPI = INTER-PACKET INTERVAL.
PACKET (N) ARRIVAL TIME − PACKET (N-1) ARRIVAL TIME = IPI.

TABLE OF INTER-PACKET INTERVALS

FIG. 18

| INTER-PACKET INTERVAL STATE (IPIS) | INTER-PACKET INTERVAL (IT = INTERVAL THRESHOLD) |
|---|---|
| 1 | IPI < IT1 |
| 2 | IT1 ≤ IPI < IT2 |
| 3 | IT2 ≤ IPI < IT3 |
| 4 | IT3 < IPI < IT4 |
| 5 | IT4 ≤ IPI < IT5 |
| 6 | IT5 ≤ IPI |

TABLE OF DEFINED INTER-PACKET INTERVAL STATES

FIG. 19

| INTERVAL THRESHOLD | TIME |
|---|---|
| IT1 | 1 NANOSECOND |
| IT2 | 100 NANOSECONDS |
| IT3 | 1 MICROSECOND |
| IT4 | 100 MICROSECONDS |
| IT5 | 1 SECOND |

TABLE OF DEFINED INTER-PACKET INTERVAL THRESHOLD VALUES

FIG. 20

| FLOW ID | APPLICATION PROTOCOL | INTER-PACKET INTERVAL PACKET (N-1) TO PACKET (N) | | | | | | |
|---|---|---|---|---|---|---|---|---|
| | | 8→9 | 9→10 | 10→11 | ••• | 47→48 | 48→49 | 49→50 |
| 1 | HTTP | IPIS=1 | IPIS=4 | IPIS=2 | ••• | IPIS=5 | IPIS=3 | IPIS=6 |
| 2 | IMAP | IPIS=6 | IPIS=4 | IPIS=5 | ••• | IPIS=3 | IPIS=1 | IPIS=2 |
| 3 | SMTP | IPIS=4 | IPIS=3 | IPIS=2 | ••• | IPIS=6 | IPIS=5 | IPIS=4 |
| 4 | HTTPS | IPIS=2 | IPIS=2 | IPIS=2 | ••• | IPIS=4 | IPIS=4 | IPIS=4 |
| 5 | HTTP | IPIS=1 | IPIS=4 | IPIS=2 | ••• | IPIS=5 | IPIS=3 | IPIS=6 |
| 6 | IMAP | IPIS=6 | IPIS=4 | IPIS=5 | ••• | IPIS=3 | IPIS=1 | IPIS=2 |
| 7 | SMTP | IPIS=4 | IPIS=3 | IPIS=2 | ••• | IPIS=6 | IPIS=5 | IPIS=4 |
| 8 | HTTPS | IPIS=2 | IPIS=2 | IPIS=2 | ••• | IPIS=4 | IPIS=4 | IPIS=4 |
| ⋮ | ⋮ | ⋮ | ⋮ | ⋮ | ⋮ | ⋮ | ⋮ | ⋮ |

} INTER-PACKET INTERVAL STATE

IPIS = INTER-PACKET INTERVAL STATE.

TABLE OF INTER-PACKET INTERVAL STATES

FIG. 21

APPLICATION PROTOCOL = HTML (A SEPARATE TABLE IS GENERATED FOR EACH PROTOCOL)

| IPIS (PACKET N) | IPIS (PACKET N+1) | INTER-PACKET INTERVAL STATE TRANSITION (IPIST) PACKET (N-1) TO PACKET (N) | | | | | | |
|---|---|---|---|---|---|---|---|---|
| | | 8→9 | 9→10 | 10→11 | ... | 47→48 | 48→49 | 49→50 |
| 1 (EXAMPLE A) | 1 | 10 | # | # | ... | # | # | # |
| | 2 | 15 | # | # | ... | # | # | # |
| | 3 | 20 | # | # | ... | # | # | # |
| | 4 | 30 | # | # | ... | # | # | # |
| | 5 | 15 | # | # | ... | # | # | # |
| | 6 | 25 | # | # | ... | # | # | # |
| 2 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |
| 3 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |
| 4 (EXAMPLE B) | 1 | # | # | # | ... | 90 | # | # |
| | 2 | # | # | # | ... | 20 | # | # |
| | 3 | # | # | # | ... | 600 | # | # |
| | 4 | # | # | # | ... | 10 | # | # |
| | 5 | # | # | # | ... | 50 | # | # |
| | 6 | # | # | # | ... | 78 | # | # |
| 5 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |
| 6 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |

# = PATH COUNT (TOTAL NUMBER OF STATE TRANSITIONS THAT FOLLOW THE N TO N+1 INTER-PACKET INTERVAL STATE PATH.

INTER-PACKET INTERVAL PREDICTION TABLE

FIG. 22

| FLOW ID | ESTIMATED APPLICATION PROTOCOL | PACKET SIZE STATE | | | | | | |
|---|---|---|---|---|---|---|---|---|
| | | PACKET 1 PSS | PACKET 2 PSS | PACKET 3 PSS | PACKET 4 PSS | PACKET 5 PSS | PACKET 6 PSS | PACKET 7 PSS |
| 1 | HTTP | PSS | PSS | PSS | PSS | PSS | PSS | PSS |
| 2 | IMAP | PSS | PSS | PSS | PSS | PSS | PSS | PSS |
| 3 | SMTP | PSS | PSS | PSS | PSS | PSS | PSS | PSS |
| 4 | HTTPS | PSS | PSS | PSS | PSS | PSS | PSS | PSS |
| 5 | HTTP | PSS | PSS | PSS | PSS | PSS | PSS | PSS |
| 6 | IMAP | PSS | PSS | PSS | PSS | PSS | PSS | PSS |
| 7 | SMTP | PSS | PSS | PSS | PSS | PSS | PSS | PSS |
| 8 | HTTPS | PSS | PSS | PSS | PSS | PSS | PSS | PSS |
| ⋮ | ⋮ | ⋮ | ⋮ | ⋮ | ⋮ | ⋮ | ⋮ | ⋮ |

FLOW ID REPRESENTS A PAIR OF PACKET FLOWS.
PSS = PACKET SIZE STATE.

APPLICATION PROTOCOL ESTIMATION
OPERATION TABLE

FIG. 24

| FLOW ID | ESTIMATED APPLICATION PROTOCOL | PREVIOUS PACKET DATA (N-1) | | | CURRENT PACKET DATA (N) | |
|---|---|---|---|---|---|---|
| | | PACKET NUMBER (N-1) | ARRIVAL TIME (N-1) | IPIS (N-1) | PACKET NUMBER (N) | ARRIVAL TIME (N) |
| 1 | HTTP | PN | AT | IPIS | PN | AT |
| 2 | IMAP | PN | AT | IPIS | PN | AT |
| 3 | SMTP | PN | AT | IPIS | PN | AT |
| 4 | HTTPS | PN | AT | IPIS | PN | AT |
| 5 | HTTP | PN | AT | IPIS | PN | AT |
| 6 | IMAP | PN | AT | IPIS | PN | AT |
| 7 | SMTP | PN | AT | IPIS | PN | AT |
| 8 | HTTPS | PN | AT | IPIS | PN | AT |
| ⋮ | ⋮ | ⋮ | ⋮ | ⋮ | ⋮ | ⋮ |

FLOW ID REPRESENTS A PAIR OF PACKET FLOWS.
IPIS = INTER-PACKET INTERVAL STATE.

INTER-PACKET INTERVAL PREDICTION
OPERATION TABLE

FIG. 25

PACKET PROCESSING TIMELINE

INTER-PACKET INTERVAL PREDICTION LEARNING ALGORITHM

TECHNICAL FIELD

The described embodiments relate generally to flow processing and more particularly to performing inter-packet interval prediction.

BACKGROUND INFORMATION

A network processor is a device that executes programs to handle packet traffic in a data network. A network processor is also often referred to as a network flow processor or simply a flow processor. Examples include network processor integrated circuits on router line cards and in other network equipment. In one example, a network processor integrated circuit is capable of receiving packets, classifying and performing atomic operations on the packets and associated packet data, and transmitting packets. Processors on the integrated circuit are called upon to perform processing functions that include using hash functions and hash tables stored in on-chip memories to find data structures that store information pertaining to different types of packets. A processor on the integrated circuit may also be called upon to determine and to log updated packet count and byte count information into appropriate tables in memory. As throughput requirements increase, ways of improving packet processing time are sought.

SUMMARY

An inter-packet interval prediction algorithm includes a learning phase and an operating phase. In the learning phase an application protocol estimation table is generated. Also generated in the learning phase is an inter-packet interval prediction table per application protocol. In the operation phase the application protocol estimation table is used to estimate the application protocol of a newly received flow pair. The estimated application protocol is used to select the appropriate inter-packet interval prediction table. The inter-packet interval prediction table is used to predict the inter-packet interval between the last received packet of the flow pair and the next packet that will be received of the flow pair.

In a first novel aspect, an application protocol estimation table is generated. A first and second packet is received onto an appliance. The first and second packets are part of the same flow pair. The application protocol and sizes of the first and second packet are determined. The packet sizes are converted into packet size states and a packet size state transition is determined beaten the first and second packet.

In a second novel aspect, an inter-packet interval prediction table is generated. A first and a second packet are received onto an appliance. The first and second packets are part of the same flow pair. The application protocol and packet arrival times of the first and second packet are determined. An inter-packet interval between the packet arrival time of the first packet and the packet arrival time of the second packet is calculated. The inter-packet interval is then converted into an inter-packet interval state.

In a third novel aspect, a packet flow data is preloaded (or stored) in local cache memory before the predicted packet arrival time of the next packet of the flow pair that will be received. A first packet is received by an appliance. The packet is part of a flow pair. An application protocol of the packet is estimated without performing deep packet inspection. The application protocol of the packet is estimated based on characteristic information. A second packet is received by the appliance. An inter-packet interval from when the second packet was received to when a third packet of the same flow pair will be received is predicted using the estimated application protocol and a packet sequence number associated with the second packet.

Characteristic information includes packet size data, packet number data, packet arrival time data, and packet direction data. Characterization information may include other information related to a packet. An application protocol signature is a group of characteristic information indicating an application protocol.

For purposes of this patent document, not withstanding other usages of the term in the art and in other patent documents, a flow is a sequence of packets sent from a particular source port and source internet protocol address to a particular destination port and destination internet protocol address. A flow can consist of all packets in a specific transport connection, but is not necessarily 1:1 mapped to a transport connection.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 11 is a table of collected application protocol learning data.

FIG. 12 is a table of defined packet size states.

FIG. 13 is a table of collected application protocol learning data converted to packet size state information.

FIG. 14 is a table of current packet size state application protocol probabilities.

FIG. 15 is an application protocol count table.

FIG. 16 is an application protocol estimation table.

FIG. 17 is a table of packet arrival time data.

FIG. 18 is a table of inter-packet intervals.

FIG. 19 is a table of defined inter-packet interval states.

FIG. 20 is a table of defined inter-packet interval threshold values.

FIG. 21 is a table of inter-packet interval states.

FIG. 22 is an inter-packet interval prediction table.

FIG. 24 is a table of application protocol estimation operation data.

FIG. 25 is a table of inter-packet interval prediction operation data.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
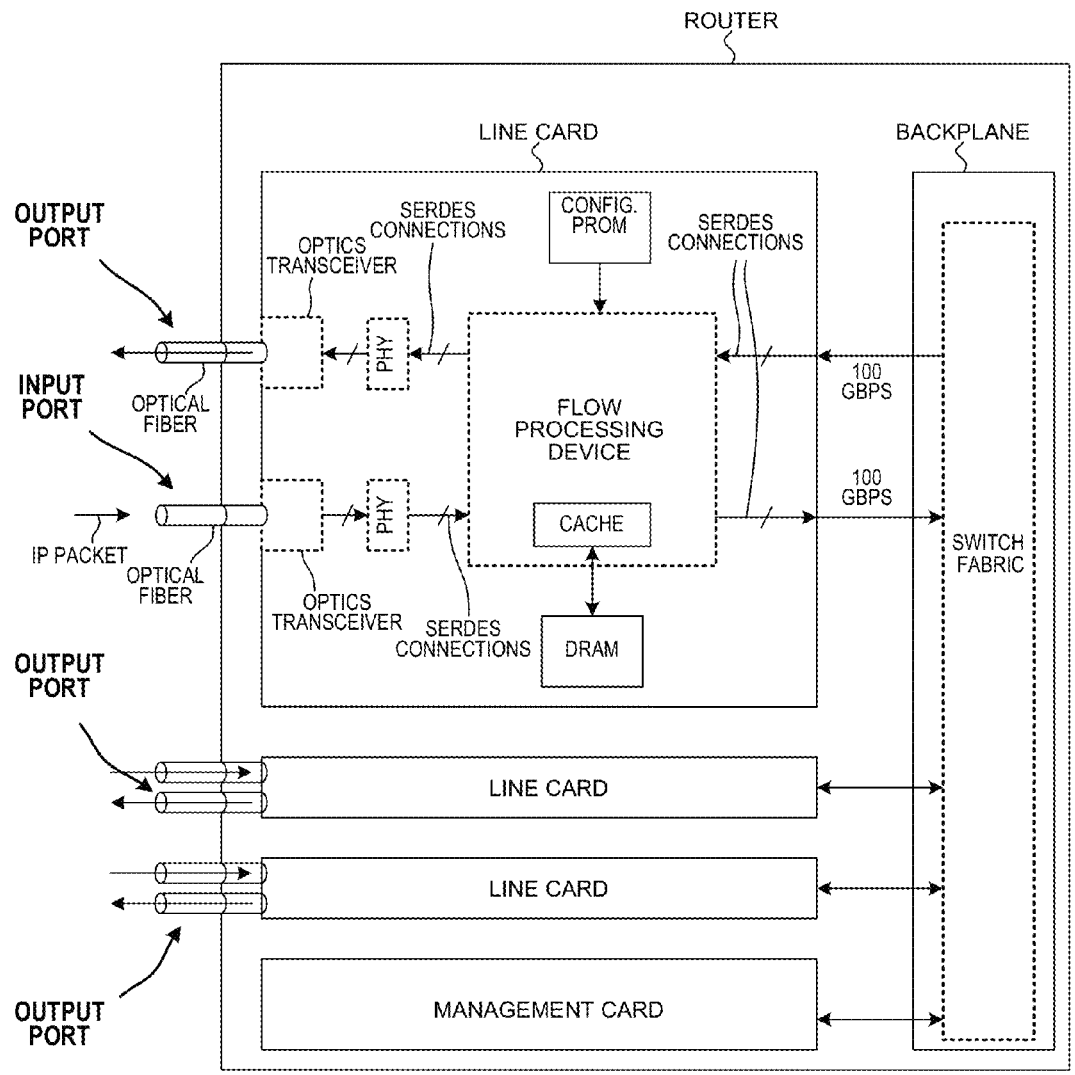
FIG. 1 (Prior Art) is a diagram of a conventional router.

FIG. 1 is a top-down diagram of a router The router includes a Flow Processing Device (FPD) and external memory (DRAM). The FPD includes a local memory cache. In operation the FPD receives incoming Internet Protocol (IP) packets and in turn reads packet flow data from the external memory (DRAM). The packet flow data is used by the FPD to process the received IP packet. Upon receiving the IP packet, the FPD sends a read request to the external DRAM memory. The FPD then performs a read from the external DRAM memory. The packet flow data read from the external DRAM memory is then stored in the local cache within the FPD. Then, only once the packet flow data is stored in the local cache, the FPD can begin the processing of the IP packet. This sequence of operation results in a time delay from when the IP packet is received by the FPD to when the FPD can begin processing the IP packet.

Figure 2:
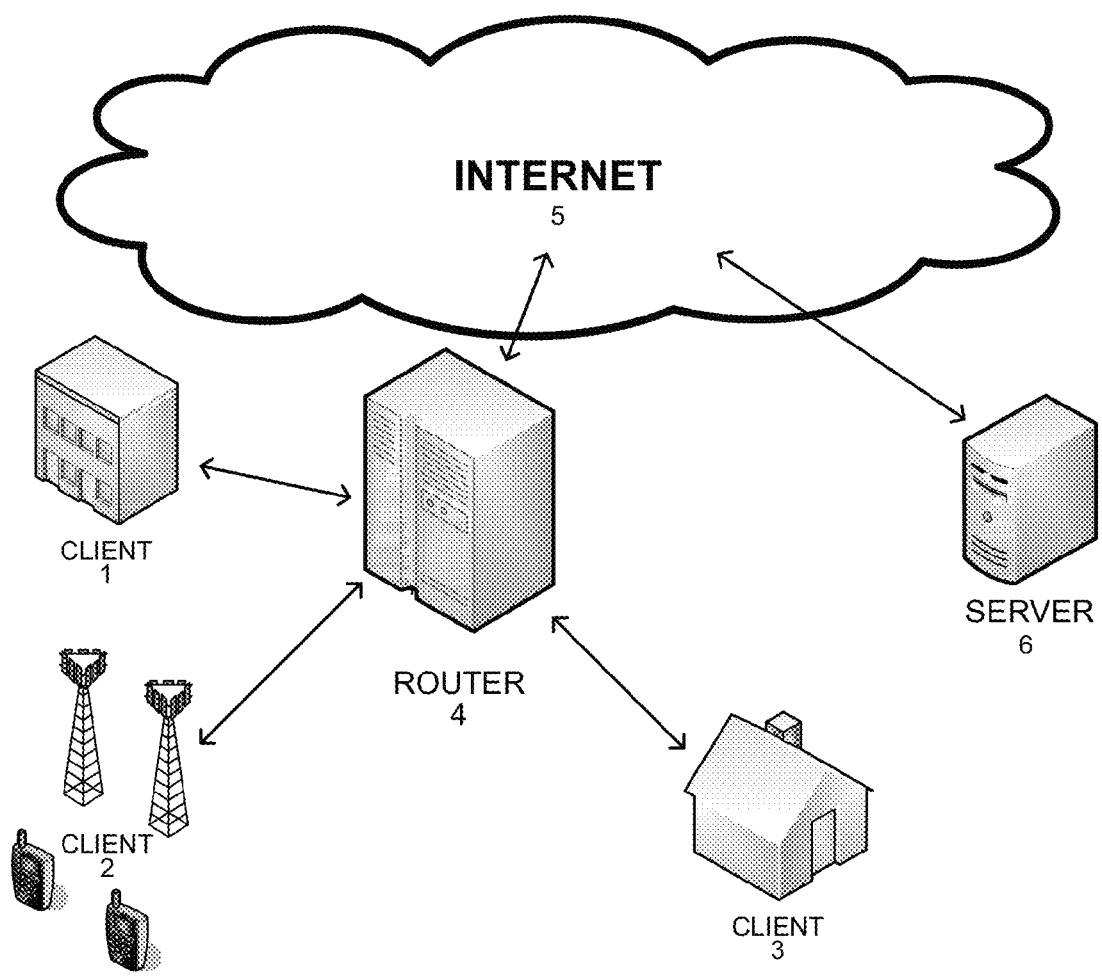
FIG. 2 is a diagram of a diagram of a communication system.

FIG. 2 is a diagram of a communication system. Client 1 is a business user node, Client 2 is a cellular network user node, and Client 3 is a residential user node. Router 4 communicates IP packets with all Clients 1-3 as well as the internet 5 and other servers 6 connected through the internet 5. The function of the router 5 is to process each IP packet received by the router 5. The process time required for each IP packet received is directly correlated to the data throughput of the router 5. A reduction in the processing time required for the router 5 to process an IP packet results in an increase in data throughput of the router 5. Therefore, there is a need for an apparatus and method for decreasing the processing time of an IP packet in a router.

Figure 3:
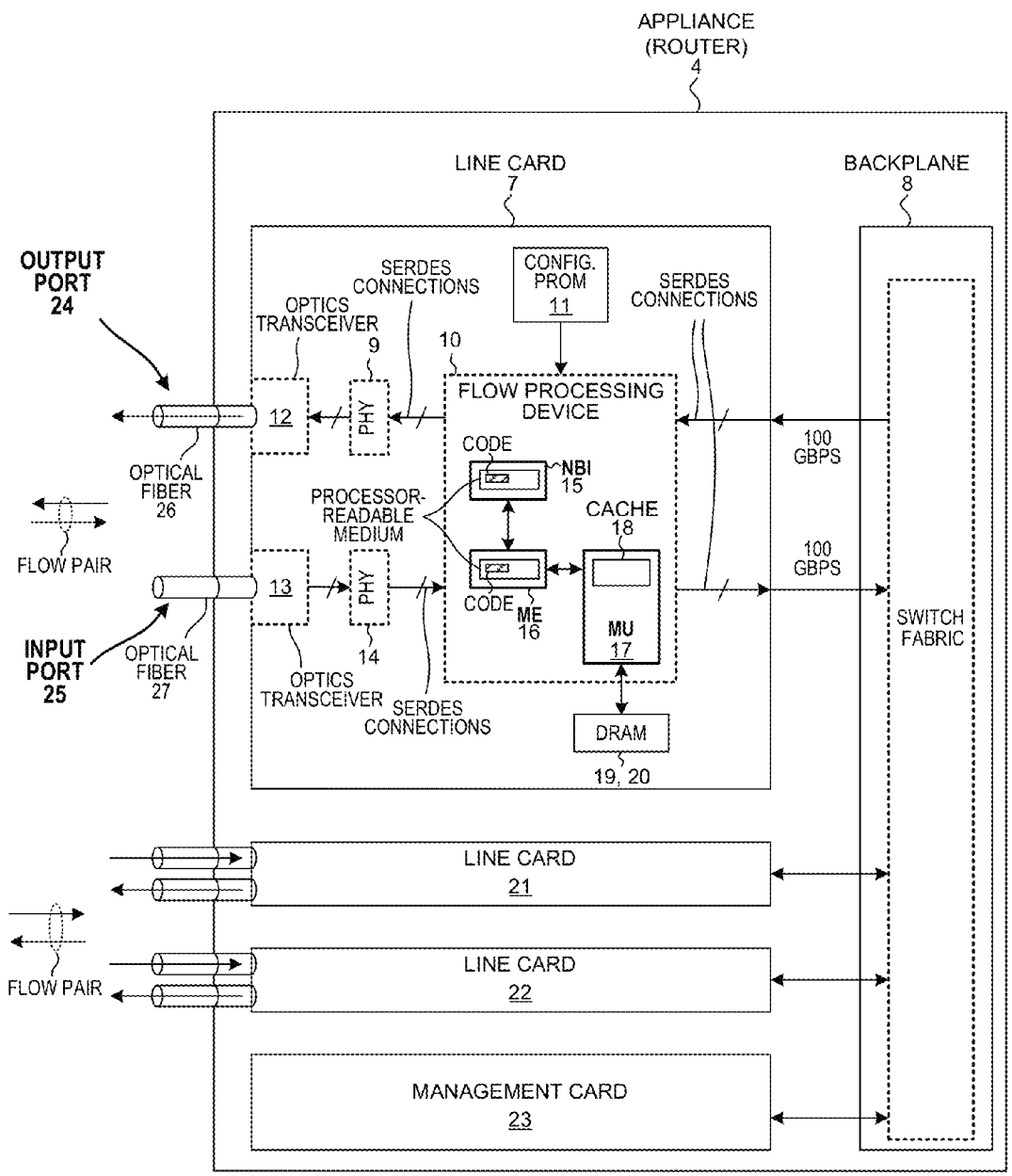
FIG. 3 is a diagram of an improved appliance with predictive caching capability.

FIG. 3 is a diagram of an appliance 4. In one embodiment, the appliance 4 is a router. The appliance 4 includes a backplane 2, a management card 3, and line cards 7 and 21-22. Each of the line cards can receive 100 Gbps (gigabits per second) packet traffic from another network via a fiber optic cable 24 and also can transmit 100 Gbps packet traffic to another network via another fiber optic cable 25. In addition, each line card can receive 100 Gbps packet traffic from the switch fabric of the backplane 8 and can also transmit 100 Gbps packet traffic to the switch fabric. Line cards 7, 21-22 are of identical construction. In this example, flows of packets are received into line card 7 from a network via the fiber optic cable 24 or from the switch fabric of backplane 8. Certain functions then need to be performed on the line card including looking up MPLS labels, determining destinations for incoming flows of packets, and scheduling the transmitting of flows of packets. Packets of the flows pass from the line card 7 and out either to the network via optical cable 25 or to the switch fabric of backplane 8.

Line card 7 includes a first optical transceiver 12, a first PHY integrated circuit 9, an Flow Processing Device (FPD) integrated circuit 10, a configuration Programmable Read Only Memory (PROM) 11, an external memory such as Dynamic Random Access Memory (DRAM) 19-20, a second PHY integrated circuit 14, and a second optical transceiver 13. Packet data received from the network via optical cable 27 is converted into electrical signals by optical transceiver 13. PHY integrated circuit 14 receives the packet data in electrical form from optical transceiver 13 and forwards the packet data to the FPD integrated circuit 10 via a SerDes connections. In one example, the flows of packets into the FPD integrated circuit 10 from optical cable 27 is 100 Gbps traffic. A set of four SerDes circuits within the FPD integrated circuit 10 receive the packet data in serialized form from SerDes connections, deserializes the packet data, and outputs packet data in deserialized form to digital circuitry within FPD integrated circuit 10.

Similarly, FPD integrated circuit 10 may output 100 Gbps packet traffic to optical cable 26. The set of four SerDes circuits within the FPD integrated circuit 10 receives the packet data in deserialized form from digital circuitry within integrated circuit 12. The four SerDes circuits output the packet data in serialized form onto SerDes connections. PHY 9 receives the serialized form packet data from SerDes connections and supplies the packet data to optical transceiver 12. Optical transceiver 12 converts the packet data into optical form and drives the optical signals through optical cable 26. Accordingly, the same set of four duplex SerDes circuits within the FPD integrated circuit 10 communicates packet data both into and out of the FPD integrated circuit 10.

FPD integrated circuit 10 can also output packet data to switch fabric of backplane 8. Another set of four duplex SerDes circuits within FPD integrated circuit 10 receives the packet data in deserialized form, and serializes the packet data, and supplies the packet data in serialized form to switch fabric of backplane 8 via SerDes connections. Packet data from switch fabric of backplane 8 in serialized form can pass from the switch fabric via SerDes connections into the FPD integrated circuit 10 and to the set of four SerDes circuits. SerDes circuits convert the packet data from serialized form into deserialized form for subsequent processing by digital circuitry within the FPD integrated circuit 10.

Management card 23 includes a CPU (Central Processing Unit). CPU handles router management functions including the configuring of the FPD integrated circuits on the various line cards 7, 21-22. CPU communicates with the FPD integrated circuits via dedicated PCIE connections. CPU includes a PCIE SerDes circuit. FPD integrated circuit 10 also includes a PCIE SerDes. The configuration information passes from the CPU to FPD integrated circuit 10 via the SerDes circuit, the SerDes connections on the backplane 8, and the PCIE SerDes circuit within the FPD integrated circuit 10.

External configuration PROM (Programmable Read Only Memory) integrated circuit 11 stores other types of configuration information such as information that configures various lookup tables on the FPD integrated circuit 10. This configuration information is loaded into the FPD integrated circuit 10 upon power up. As is explained in further detail below, FPD integrated circuit 10 can store various types of information including buffered packet data in external DRAM integrated circuits 19-20.

Figure 4:
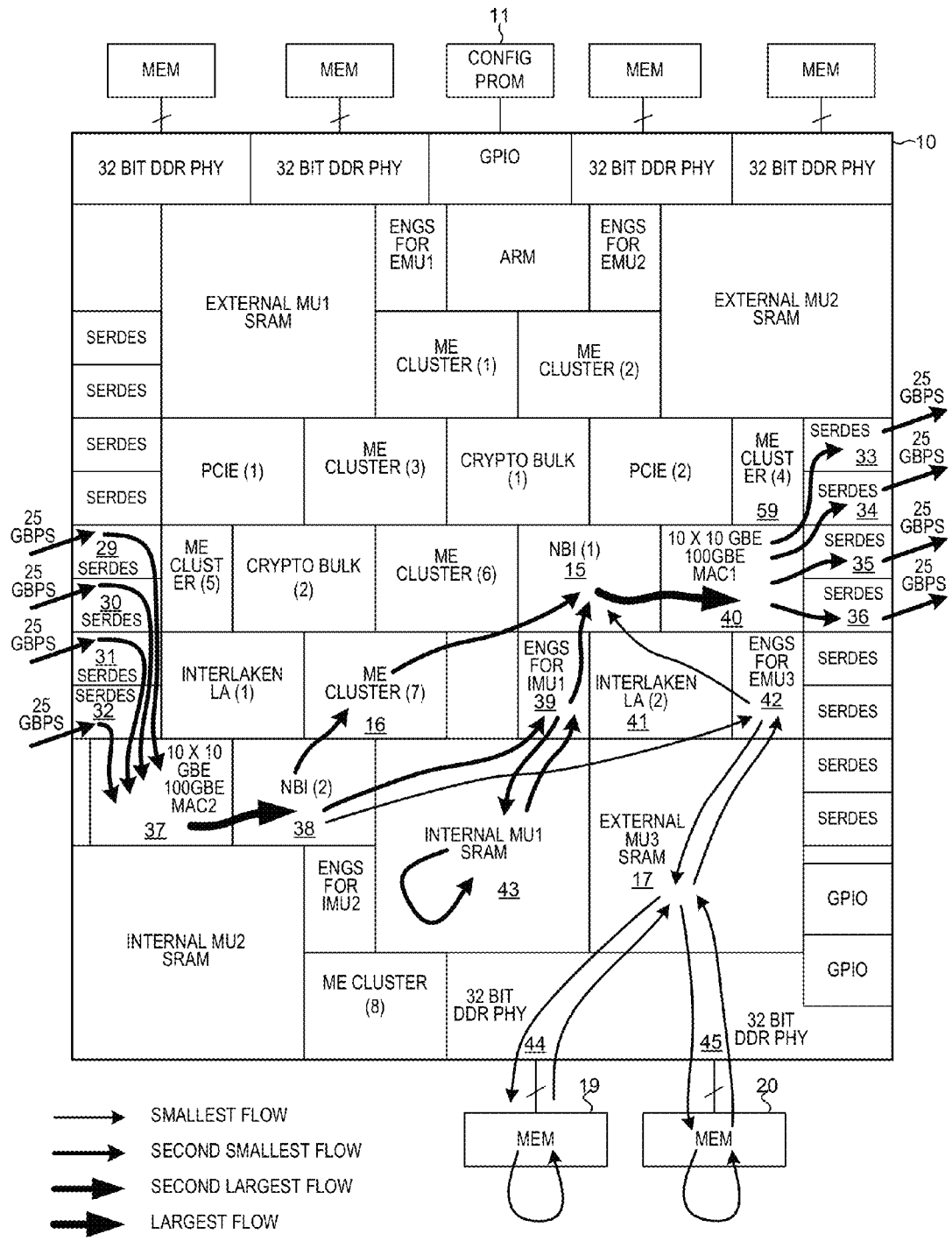
FIG. 4 is a diagram of the flow processing device of FIG. 3, in one novel aspect.

FIG. 4 is a top-down diagram of a Flow Processing Device (FPD) integrated circuit 10 an MPLS router application. In one example, the FPD may be an Island-Based Network Flow Processor (IB-NFP). FPD integrated circuit 10 includes many I/O (input/output) terminals (not shown). Each of these terminals couples to an associated terminal of the integrated circuit package (not shown) that houses the FPD integrated circuit. The integrated circuit terminals may be flip-chip microbumps and are not illustrated. Alternatively, the integrated circuit terminals may be wire bond pads.

SerDes circuits 29-32 are the first set of four SerDes circuits that are used to communicate with an external network via optical cables. SerDes circuits 33-36 are the second set of four SerDes circuits that are used to communicate with a switch fabric (not shown) of the router. Each of these SerDes circuits 33-36 is duplex in that it has a SerDes connection for receiving information and it also has a SerDes connection for transmitting information. Each of these SerDes circuits can communicate packet data in both directions simultaneously at a sustained rate of 25 Gbps. FPD integrated circuit 10 accesses external memory integrated circuits via corresponding 32-bit DDR physical interfaces. FPD integrated circuit 10 also has several general purpose input/output (GPIO) interfaces. One of these GPIO interfaces is used to access external PROM.

In addition to the area of the input/output circuits outlined above, the FPD integrated circuit 10 also includes two additional areas. The first additional area is a tiling area of islands. Each of the islands is either of a full rectangular shape, or is half the size of the full rectangular shape. For example, the island labeled "PCIE (1)" is a full island. The island below it labeled "ME CLUSTER (5)" is a half island. The functional circuits in the various islands of the tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

The arrows in FIG. 4 illustrate an operational example of FPD integrated circuit 10 within the MPLS router. 100 Gbps packet traffic is received onto the router via an optical cable (not shown), flows through an optics transceiver (not shown), flows through a PHY integrated circuit (not shown), and is received onto FPD integrated circuit 10, is spread across the four SerDes I/O blocks 29-32. Twelve virtual input ports are provided at this interface. The symbols pass through direct dedicated conductors from the SerDes blocks 29-32 to ingress MAC island 37. Ingress MAC island 37 converts successive symbols delivered by the physical coding layer into packets by mapping symbols to octets, by performing packet framing, and then by buffering the resulting packets for subsequent communication to other processing circuitry. The packets are communicated from MAC island 37 across a private inter-island bus to ingress NBI (Network Bus Interface) island 38. In addition to the optical cable that supplies packet traffic into the FPD integrated circuit from the router, there is another optical cable that communicates packet traffic in the other direction out of the FPD integrated circuit and to the router.

For each packet received onto the FPD in the example of FIG. 4, the functional circuitry of ingress NBI island 38 examines fields in the header portion to determine what storage strategy to use to place the packet into memory. In one example, NBI island 38 examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP. NBI island 38 examines a packet header, performs packet preclassification, determines that the packet is a fast-path packet, and determines that the header portion of the packet should be placed into a CTM (Cluster Target Memory) in ME (Microengine) island 16. The header portion of the packet is therefore communicated across the configurable mesh data bus from NBI island 38 to ME island 16. The CTM is tightly coupled to microengines in the ME island 16. The ME island 16 determines header modification and queuing strategy for the packet based on the packet flow (derived from packet header and contents) and the ME island 16 informs a second NBI island 15 of these. The payload portions of fast-path packets are placed into internal SRAM (Static Random Access Memory) MU block 43 and the payload portions of exception packets are placed into external DRAM 19 and 20. In one example, NBI island 15 includes a processor and a processor-readable medium including code. The code includes processor-executable instructions for performing the steps of: (a) receiving a first packet, wherein the first packet is part of a flow pair, and wherein the flow pair has an application protocol; (b) determining an estimated application protocol, wherein the determining of (b) occurs after the receiving of (a); (c) receiving a second packet; and (d) predicting an inter-packet interval from when the second packet was received to when a third packet of the same flow pair will be received. The predicting of (d) is based upon 1) the application protocol estimated in (b) and 2) a packet sequence number associated with the second packet received. In one example, steps (a), (b), and (c) are performed by the appliance. In another example, ME island 16 includes a processor and a processor-readable medium including code. The code includes processor-executable instructions for performing the steps of: (a) receiving a first packet, wherein the first packet is part of a flow pair, and wherein the flow pair has an application protocol; (b) determining an estimated application protocol, wherein the determining of (b) occurs after the receiving of (a); (c) receiving a second packet; and (d) predicting an inter-packet interval from when the second packet was received to when a third packet of the same flow pair will be received. The predicting of (d) is based upon 1) the application protocol estimated in (b) and 2) a packet sequence number associated with the second packet received. In one example, steps (a), (b), and (c) are performed by the appliance.

Half island 39 is an interface island through which all information passing into, and out of, SRAM MU block 43 passes. The functional circuitry within half island 39 serves as the interface and control circuitry for the SRAM within block 43. For simplicity purposes in the discussion below, both half island 39 and MU block 43 may be referred to together as the MU island, although it is to be understood that MU block 43 is actually not an island as the term is used here but rather is a block. The payload portion of the incoming fast-path packet is communicated from NBI island 38, across the configurable mesh data bus to SRAM control island 39, and from control island 39, to the interface circuitry in block 43, and to the internal SRAM circuitry of block 43. The internal SRAM of block 43 stores the payloads so that they can be accessed for flow determination by the ME island.

In addition, a preclassifier in the ingress NBI island 37 determines that the payload portions for others of the packets should be stored in external DRAM 19 and 20. For example, the payload portions for exception packets are stored in external DRAM 19 and 20. Interface island 42, external MU SRAM block 17, and DDR PHY I/O blocks 44 and 45 serve as the interface and control for external DRAM integrated circuits 19 and 20. The payload portions of the exception packets are therefore communicated across the configurable mesh data bus from NBI island 38, to interface and control island 42, to external MU SRAM block 17, to 32-bit DDR PHY I/O blocks 44 and 45, and to external DRAM integrated circuits 19 and 20. At this point in the operational example, the packet header portions and their associated payload portions are stored in different places. The payload portions of fast-path packets are stored in internal SRAM in MU block 43, whereas the payload portions of exception packets are stored in external SRAM in external DRAMs 19 and 20.

ME island 16 informs second NBI island 15 where the packet headers and the packet payloads can be found and provides the second NBI island 15 with an egress packet descriptor for each packet. The egress packet descriptor indicates a queuing strategy to be used on the packet. Second NBI island 15 uses the egress packet descriptor to read the packet headers and any header modification from ME island 16 and to read the packet payloads from either internal SRAM 43 or external DRAMs 19 and 20. Second NBI island 15 places packet descriptors for packets to be output into the correct order. For each packet that is then scheduled to be transmitted, the second NBI island 15 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 15 then performs any indicated packet modification on the packet. The resulting modified packet then passes from second NBI island 15 and to egress MAC island 40.

Egress MAC island 40 buffers the packets, and converts them into symbols. The symbols are then delivered by conductors from the MAC island 40 to the four SerDes I/O blocks 33-36. From SerDes I/O blocks 33-36, the 100 Gbps outgoing packet flow passes out of the IB-NFP integrated circuit 1 and to the switch fabric (not shown) of the router. Twelve virtual output ports are provided in the example of FIG. 4.

General Description of the CPP Data Bus: A Command-Push-Pull (CPP) data bus structure that interconnects functional circuitry in the islands of FIG. 4. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion to form the staggered pattern. For additional information on the FPD, the FPD's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

Figure 5:
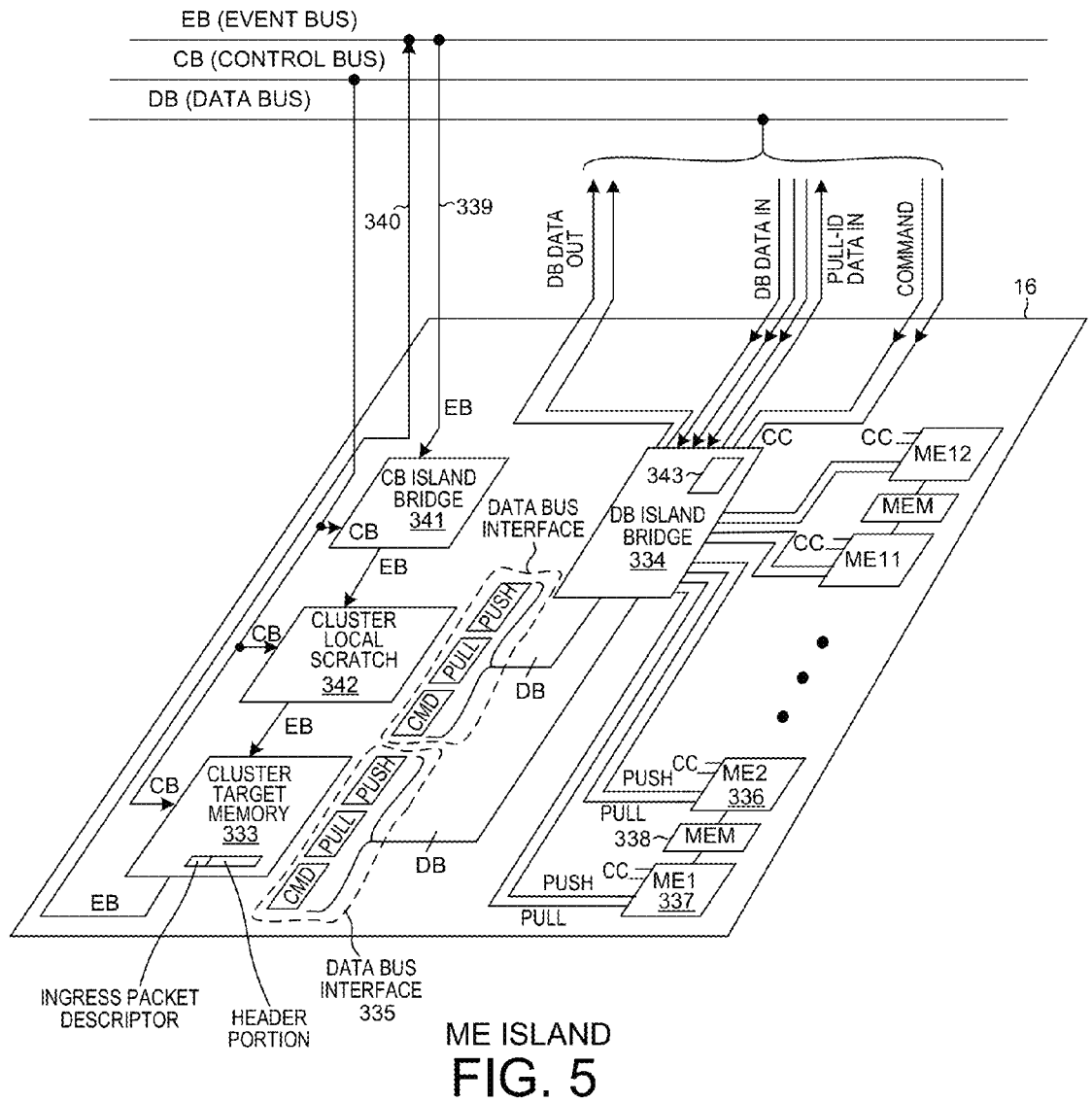
FIG. 5 is a simplified diagram of microengine (ME) island 16 of the flow processing device of FIG. 3.

ME Island: FIG. 5 is a diagram of the microengine (ME) island 16. In the operational flow of FIG. 1, packet headers and the associated preclassification results are DMA transferred from the ingress NBI island 38 across the configurable mesh data bus and into the Cluster Target Memory (CTM) 333 of ME island 16. A DMA engine in the ingress NBI island 38 is the master and CTM 333 in ME island 16 is the target for this transfer. The packet header portions and the associated ingress packet descriptors pass into the ME island via data bus island bridge 334 and data bus interface circuitry 335. Once in the CTM 333, the header portions are analyzed by one or more microengines. The microengines have, through the DB island bridge 334, a command out interface, a pull-id in interface, a pull-data out interface, and a push data in interface. There are six pairs of microengines, with each pair sharing a memory containing program code for the microengines. Reference numerals 336 and 337 identify the first pair of microengines and reference numeral 338 identifies the shared memory. As a result of analysis and processing, the microengines modify each ingress packet descriptor to be an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

Figure 6:
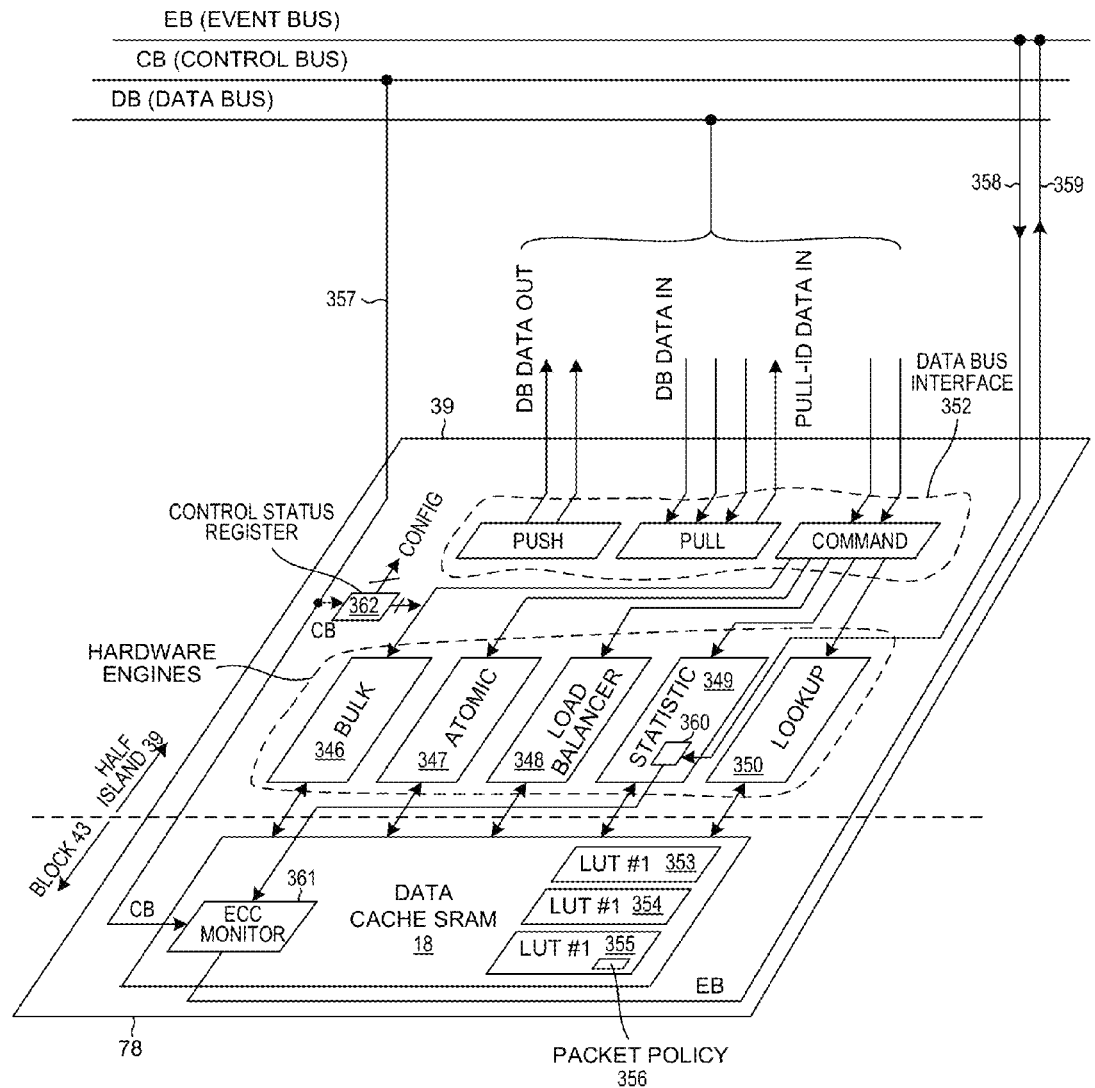
FIG. 6 is a simplified diagram of the memory unit (MU) block 17 of the flow processing device of FIG. 3.

MU Island: FIG. 6 is a diagram of MU half island 39 and SRAM block 43. MU half island 39 includes several hardware engines 346-350. In the operational example, fast path packet payloads are DMA transferred directly from ingress NBI island 38 and across the configurable mesh data bus, through data bus interface 352 of half island 39, and into the data cache SRAM 18 of block 43. The ingress NBI DMA engine issues a bulk write command across the configurable mesh data bus to the bulk transfer engine 346. The destination is the MU island 39. The action is bulk write. The address where the data is to be written into the MU island is the address taken out of the appropriate buffer list. The bulk write command received at the MU is a bulk write, so the data bus interface 352 presents the command to the bulk engine 346. The bulk engine 346 examines the command which is a write. In order to perform a write the bulk engine needs data, so the bulk engine issues a pull-id through the pull portion of interface 352, which in turn issues a pull-id back onto the configurable mesh data bus. The DMA engine in NBI island 38 receives the pull-id. Part of the pull-id is a data reference which indicates to the DMA engine which part of the packet is being requested as data. The DMA engine uses the data reference to read the requested part of the packet, and presents that across the data part of the data bus back to bulk engine 346 in MU island 39. The bulk engine 346 then has the write command and the packet data. The bulk engine 346 ties the two together, and it then writes the packet data into SRAM 18 at the address given in the write command. In this way, fast path packet payload portions pass from DMA engine in the ingress NBI island, across the configurable mesh data bus, through the data bus interface 352, through a bulk transfer engine 346, and into data cache SRAM 18 of block 43. In a similar fashion, exception packet payload portions pass from the DMA engine in ingress NBI island 38, across the configurable mesh data bus, through the data bus interface of half island 42, through the bulk transfer engine of half island 42, and through DDR PHYs 44 and 45, and into external memories 19 and 20.

Figure 7:
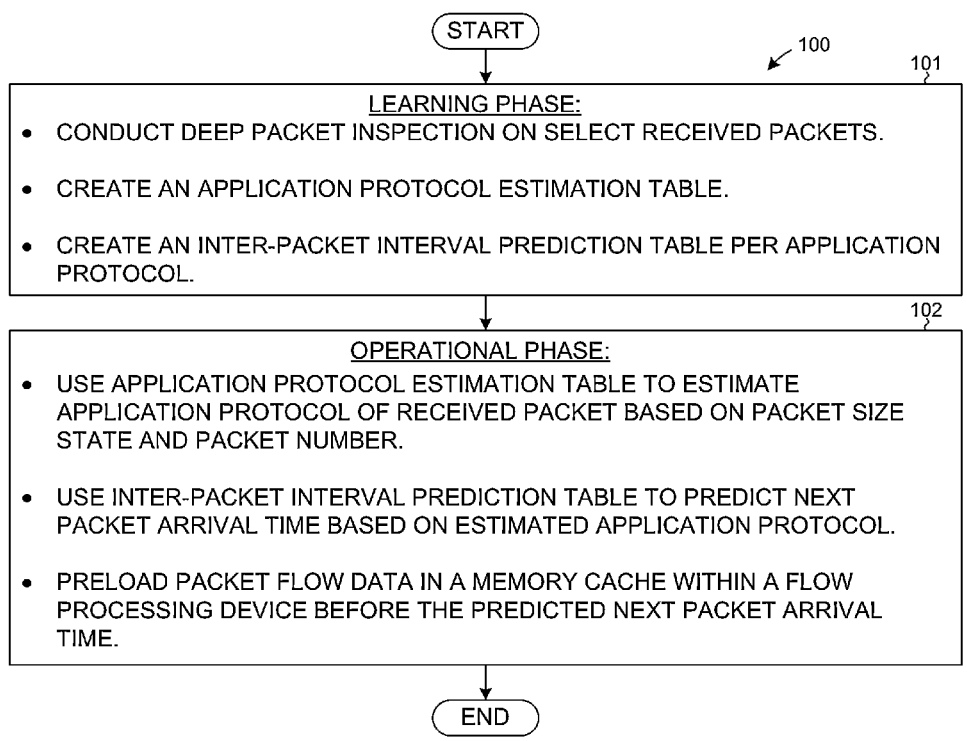
FIG. 7 is a flowchart providing an overview of predictive caching.

FIG. 7 is a high level flowchart 100 of a predictive caching process. The learning phase of the predictive caching process is listed in Step 101. In the learning phase, deep packet inspection is conducted on selected received packets. An application protocol estimation table (APET) is then generated based upon the deep packet inspection results. Lastly, an inter-packet interval prediction table is created per application protocol. The operational phase of the predictive caching process is listed in Step 102. In the operational phase, the application protocol estimation table is used to estimate the application protocol of a received packet. In one embodiment, the application protocol is estimated based upon packet size and packet number (as received). The next packet arrival time is then predicted using the inter-packet interval prediction table created for the estimated application protocol. Lastly, packet flow data is preloaded (or stored) in a memory cache within a FPD before the predicted next packet arrival time. In the operational phase, the packet flow data required to process the packet is preloaded in the FPD cache before the packet is received. This eliminating the delay incurred when the FPD performs a read from external DRAM memory.

Characteristic information includes packet size data, packet number data, packet arrival time data, and packet direction data. Characterization information may include other information related to a packet. An application protocol signature is a group of characteristic information indicating an application protocol.

Figure 8:
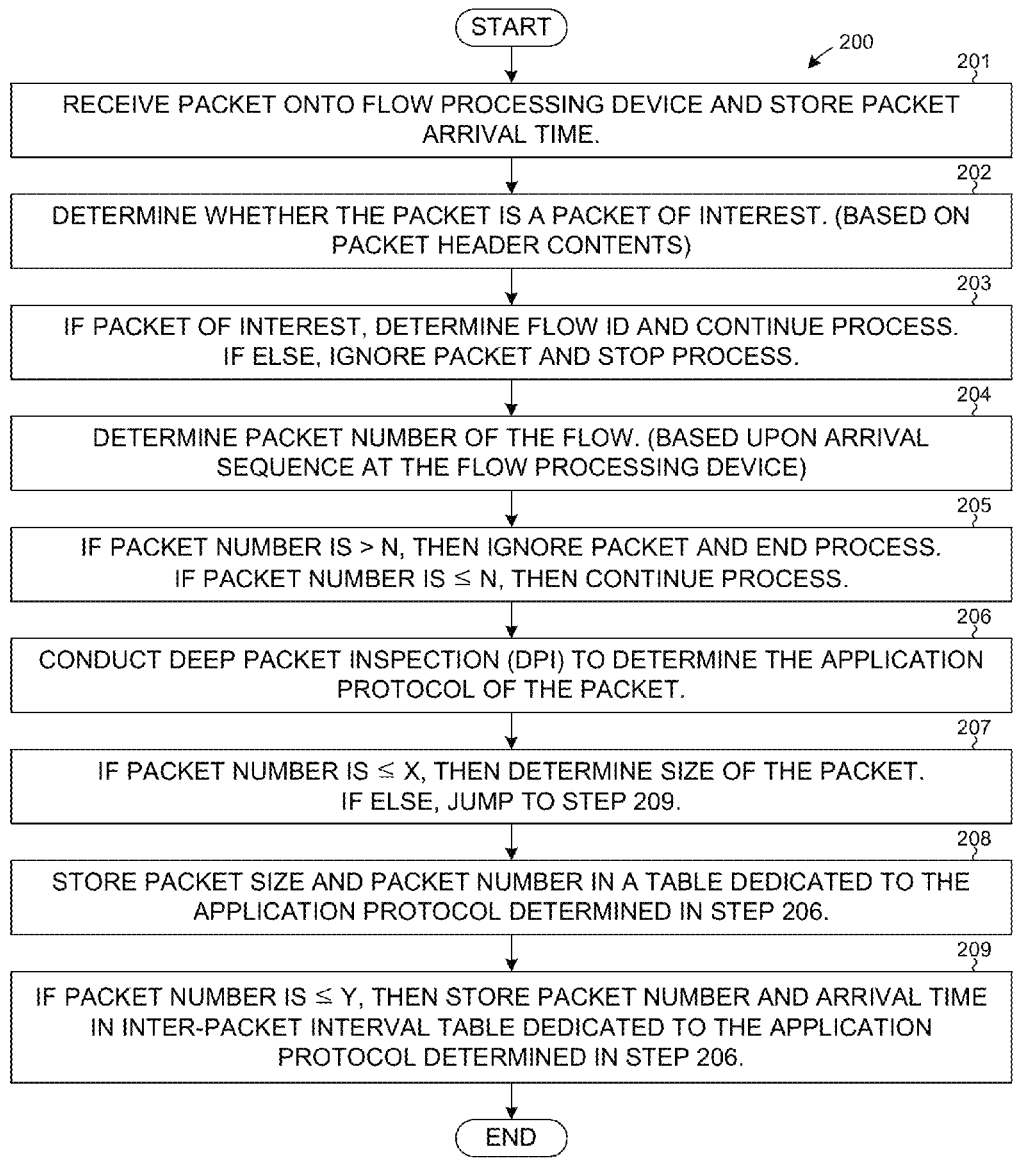
FIG. 8 is a flowchart of the predictive caching learning phase.

FIG. 8 is a detailed flowchart 200 of the predictive caching learning phase. In Step 201 a packet is received onto a FPD and the arrival time of the packets is stored. Then a determination is made as to whether the packet is a packet of interest. In one example, the determination is made based upon the contents of the header. In another example, the determination is made based upon the size of the header. If the packet is determined to be a packet of interest, then a flow identification (ID) is determined (Step 203). If the packet is determined to not be a packet of interest, then the packet is ignored and the process stops. In Step 204, the packet number of the flow is determined. In one example, the packet number is based upon the sequence in which the packets of a flow are received. In another example, the packet number is based upon the sequence in which the packets of a flow are transmitted. In Step 205, it is determined if the packet number is greater than a threshold value. If the packet number is greater than the threshold value, then the packet is ignored and the process stops. If the packet number is not greater than the threshold value, then the process continues to Step 206. In Step 206, Deep Packet Inspection (DPI) is conducted on the packet to determine the application protocol of the packet. In Step 207, it is determined if the packet number is less than or equal to a second threshold value. If the packet number is not less than or equal to the second threshold value, then the size of the packet is determined. If the packet number is less than or equal to the second threshold value, then the flow jumps to Step 209. In Step 208, the packet number and the size of the packet are stored in a table assigned to the application protocol determined in Step 206. In Step 209, if the packet number is less than or equal to a third threshold value, the packet number and arrival time are stored in an inter-packet interval table dedicated to the application protocol determined in Step 206.

Figure 9:
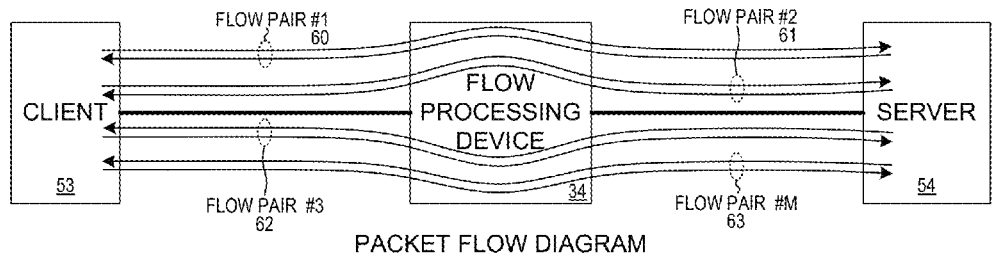
FIG. 9 is a simplified packet flow diagram.

FIG. 9 is a packet flow diagram. As discussed above, for purposes of this patent document, not withstanding other usages of the term in the art and in other patent documents, a flow is a sequence of packets sent from a particular source port and source IP address to a particular destination port and destination IP address. A flow can consist of all packets in a specific transport connection, but is not necessarily 1:1 mapped to a transport connection.

Figure 10:
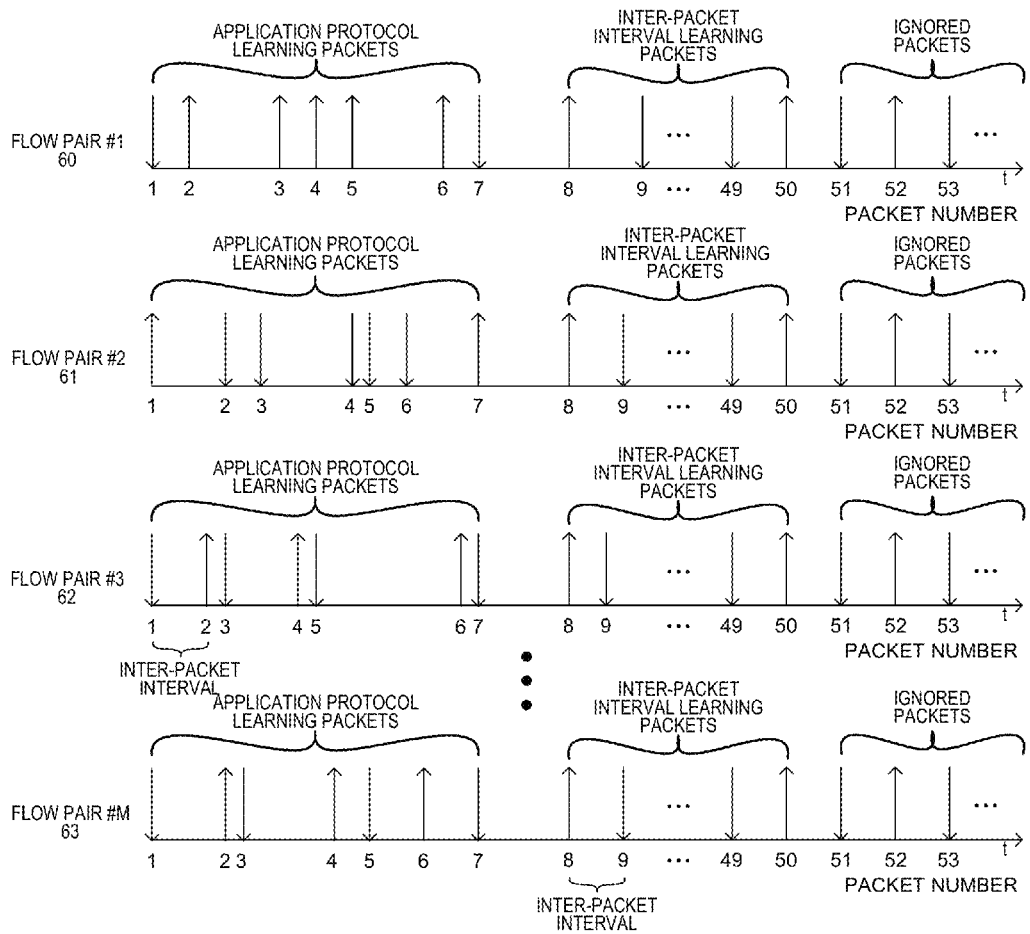
FIG. 10 is a learning phase diagram of each flow pair illustrated in FIG. 9.

Flow Processing Device (FPD) 34 communicates packets with client 53 and Server 54. In one example, a first packet is communicated from client 53 to FPD 34, then FPD 34 communicates the first packet to Server 54. This overall communication from the client 53 to the server 54 is referred to as a communicated packet of a first flow. In another example, a second packet is communicated from server 54 to FPD 34, then FPD 43 communicates the second packet to client 53. This overall communication from the server 54 to the client 53 is referred to as a communicated packet of a second flow. While four flow pairs 60-63 are illustrated in FIG. 9, a FPD device may process many more flow pairs. Only four flow pairs 60-63 are illustrated in FIGS. 9 and 10 for simplicity. Each flow pair include a flow of packets communicated from the client 53 to the server 54 and a flow of packets communicated from the server 54 to the client 53. Each flow pair is received and transmitted by the FPD 34. As discussed above, the FPD may perform various functions (i.e., routing of the IP packet, encryption detection, data metering, etc).

FIG. 10 is a learning phase packet diagram. FIG. 10 illustrates the packets communicated in each of the four flow pairs 60-63 shown in FIG. 9. Each flow pair shares the same application protocol and includes multiple packets that are communicated from client 53 to server 54 and from server 54 to client 53. Upward arrows represent packets communicated in a first packet flow direction from client 53 to server 54. Downward arrows represent packets communicated in a second packet flow direction from server 54 to client 53. Each packet has a packet size, packet flow direction (client to server or server to client), and packet arrival time. In one example, the packet size is the total number of bits included in the packet. In another example, the packet size is the number of bits included in the header of the packet. In yet another example, the packet size is the number of bits included in the payload of the packet. The packet arrival time is the time at which the packet was received. The time interval between the arrival time of sequentially received packets is referred to as an inter-packet interval. A first group of packets for each flow pair are designated to be "application protocol learning packets". A second group of packets for each flow are designated to "inter-packet interval learning packets". The packet size and packet direction are recorded for each application protocol learning packet. The packet arrival time is recorded for each inter-packet interval learning packet. Learning information is recorded for the first M flow pairs of a particular application protocol. The number of packets designated as application protocol learning packets and inter-packet interval learning packets may vary across different embodiments of the present invention. The embodiment of FIG. 10 designates the first seven packets of a flow pair as application protocol learning packets and the eighth to fiftieth packet as inter-packet interval learning packets. All packets following the fiftieth packet of a flow pair are ignored during the learning phase.

In one example, a first plurality of flow pairs having a Hyper Text Markup Language (HTML) application protocol and a second plurality of flow pairs having a Standard Mail Transfer Protocol (SMTP) application protocol are processed by FPD 34. As described above, the first seven packets of the first M flow pairs having an HTML application protocol will be designated HTML application protocol learning packets and the eighth to fiftieth packets will be designated HTML inter-packet interval learning packets. The packet size and packet direction for each of the HTML application learning packets will be recorded. The packet arrival time for each of the HTML inter-packet interval learning packets will be recorded. Similarly, the first seven packets of the first M flow pairs having a SMTP application protocol will be designated application protocol learning packets and the eighth to fiftieth packets will be designated inter-packet interval learning packets. The packet size and packet direction for each of the SMTP application learning packets will be recorded. The packet arrival time for each of the SMTP inter-packet interval learning packets will be recorded.

FIG. 11 is a table of application protocol learning data. Application protocol learning data refers to the information recorded regarding the various learning packets. The table of FIG. 11 has a flow identification (ID) column, an application protocol column, and separate columns for each of the first seven packet numbers. A flow ID represents a numerical reference for each flow pair processed by the FPD 34. The application protocol column indicates the application protocol of the flow pair. Each cell in a packet number column includes packet size and packet direction information. For example, for flow ID "1" and packet number "1" the corresponding cell includes packet size information of "32 B" (thirty-two bytes) and "S→C" (direction is server to client). Similarly, for flow ID "1" and packet number "3" the corresponding cell includes packet size information of "128 B" (one hundred and twenty-eight bytes) and "C→6" (direction is client to server). As indicated in FIG. 11, the packet size and packet direction information is recorded for multiple flow pairs having multiple application protocols.

FIG. 12 is a table of defined packet size states. The table of FIG. 12 has a packet size column and a packet size range. The packet size state is a numerical reference to one of six states. The first packet size state corresponds to a packet being communicated from the client 53 to the server 54 that has a packet size within the range of zero to less than one hundred bytes. The second packet size state corresponds to a packet being communicated from the client 53 to the server 54 that has a packet size within the range of one hundred bytes to less than a maximum packet size value. The third packet size state corresponds to a packet being communicated from the client 53 to the server 54 that has a packet size within the range of any size greater than the maximum packet size value. The fourth packet size state corresponds to a packet being communicated from the server 54 to the client 53 that has a packet size within the range of zero to less than one hundred bytes. The fifth packet size state corresponds to a packet being communicated from the server 54 to the client 53 that has a packet size within the range of one hundred bytes to less than a maximum packet size value. The sixth packet size state corresponds to a packet being communicated from the server 54 to the client 53 that has a packet size within the range of any size greater than the maximum packet size value.

FIG. 13 is a table of application protocol learning data converted to packet size state information. Application of the table of defined packet size states shown in FIG. 12 to the table of application protocol learning data shown in FIG. 11 produces the table of application protocol learning data converted to packet size state information shown in FIG. 13. For example in FIG. 11, for flow ID "1" and packet number "1" the corresponding cell includes packet size information of "32 B" (thirty-two bytes) and "S→C" (direction is server to client). This packet size and packet direction corresponds to packet size state 4 shown in FIG. 12. Accordingly, for flow ID "1" and packet number "1" the corresponding cell includes packet size state information "PSS=4" (packet size state is four). Similarly in FIG. 11, for flow ID "1" and packet number "3" the corresponding cell includes packet size information of "128 B" (one hundred and twenty-eight bytes) and "C→S" (direction is client to server). This packet size and packet direction corresponds to packet size state 2 shown in FIG. 12. Accordingly, for flow ID "1" and packet number "3" the corresponding cell includes packet size state information "PSS=2" (packet size state is two). As indicated in FIG. 13, the packet size state is recorded for multiple flow pairs having multiple application protocols.

FIG. 14 is a table of current packet size application protocol probabilities. Based upon recording the packet size and packet direction of the first seven packets of the first M flow pairs having a HTML application protocol, a probability that a new flow pair (M+1 or greater) has an HTML application protocol can be calculated. For example, if across M HTML flow pairs packet number "1s" a packet size state of "PSS=4" (packet size state is four) is recorded only ten percent of the time then the probability that a new flow pair having a first packet with packet size state of four has a HTML application protocol is ten percent. Likewise, if across M HTML flow pairs packet number "1s" a packet size state of "PSS=1" (packet size state is one) is recorded ninety percent of the time then the probability that a new flow pair having a first packet with packet size state of one has a HTML application protocol is ninety percent.

FIG. 15 is an application protocol count table for a HTML application protocol. An application protocol count table is created for each application protocol. The table of FIG. 15 includes a packet size state (PSS) of packet n−1 column, a PSS of packet n column, and six packet size state transition (PSST) columns. In FIG. 15, the variable n represents the second packet number listed in a PSST column. Each PSST column includes a count of packet size state transitions between packet n−1 and packet n. For example (Example A in FIG. 15), if packet "1" of a flow pair has a packet size state of one and packet "2" of the flow pair has a packet size state of one then the count stored in the corresponding cell in the PSST #1→#2 is incremented. Likewise in another example (Example B in FIG. 15), if packet "3" of a flow pair has a packet size state of two and packet "4" of the flow pair has a packet size state of six then the count stored in the corresponding cell in the PSST #3→#4 is incremented. The count for each HTML packet size state transaction is recorded in the table of FIG. 15. A similar table is generated for each application protocol processed by the FPD.

In one example, a first plurality of flow pairs having a Hyper Text Markup Language (HTML) application protocol and a second plurality of flow pairs having a Standard Mail Transfer Protocol (SMTP) application protocol are processed by FPD 34. As described above, a first application protocol count table will be generated for the HTML application protocol and a second application protocol count table will be generated for the SMTP application protocol.

FIG. 16 is an application protocol estimate table. The application protocol estimation table indicates the Most Likely Application Protocol (MLAP) and the probability that the packet received is the MLAP. The MLAP is calculated by comparing each PSST count value of each application protocol count table across all the application protocol count tables recorded. For example, an application protocol count table is generated for HTML, SMTP, IMAP, and HTTP. For PSST #1→#2, PSS(n−1) is one, and PSS(n) is one, HTML has an application protocol count value of ten. For PSST #1→#2, PSS(n−1) is one, and PSS(n) is one, SMTP has an application protocol count value of twenty. For PSST #1→#2, PSS(n−1) is one, and PSS(n) is one, IMAP has an application protocol count value of forty. For PSST #1→#2, PSS(n−1) is one, and PSS(n) is one, HTTP has an application protocol count value of thirty. Since forty is the greatest count value, IMAP is the MLAP.

The probability that packet(n) is the MLAP is calculated by summing the PSST count value of each application protocol count table across all the application protocol count tables recorded and dividing each individual PSST count value by the sum of PSST count values. For example, the sum of all count values for PSST #1→#2, PSS(n−1) is one, and PSS(n)

is one, is one hundred (10+20+40+30=100). Dividing each individual application protocol count value by the sum of all count values will result in the percentage that the PSST for PSS(n−1) to PSS(n) is the individual application protocol. For HTML, ten divided by one hundred is ten percent. For SMTP, twenty divided by one hundred is twenty percent. For IMAP, forty divided by one hundred is forty percent. For HTTP, thirty divided by one hundred is thirty percent. Therefore the probability that the packet has the MLAP is forty percent.

FIG. 17 is a table of packet arrival time data. Packet arrival time data refers to the packet arrival time information recorded regarding the plurality of inter-packet interval learning packets illustrated in FIG. 10. The table of FIG. 17 has a flow identification (ID) column, an application protocol column, and separate columns for packet number "8" to packet number "50". A flow ID represents a numerical reference for each flow pair processed by the FPD 34. The application protocol column indicates the application protocol of the flow pair. Each cell in a packet number column includes packet arrival time information. As indicated in FIG. 17, the packet arrival time information is recorded for multiple flow pairs having multiple application protocols. In one example, the packet arrival time is a time stamp of the approximate time when the packet was received. In another example, the packet arrival time is a count of clock cycles before the packet was received.

FIG. 18 is a table of inter-packet intervals. The packet arrival time information of FIG. 17 is used to calculate the inter-packet intervals included in FIG. 18. Inter-packet interval refers to the time interval between the packet arrival time of packet(n−1) and packet(n). The table of FIG. 18 has a flow identification (ID) column, an application protocol column, and separate columns for inter-packet intervals between each sequential packet between packet number "8" and packet number "50". A flow ID represents a numerical reference for each flow pair processed by the FPD 34. The application protocol column indicates the application protocol of the flow pair. Each cell in a inter-packet interval column includes inter-packet interval information. As indicated in FIG. 18, the inter-packet interval information is recorded for multiple flow pairs having multiple application protocols. Referring to FIG. 17, for flow ID "1" the interval between the packet arrival time of packet "8" and the packet arrival time of packet "9" is the inter-packet interval (IPI) included in the inter-packet interval "8→9" column in the flow ID "1" row. In one example, the IPI is calculated by subtracting a count of clock cycles counted before packet "8" was received from a count of clock cycles counted before packet "9" was received. The resulting difference in clock cycles multiplied by the time per cycle results in the inter-packet interval between the packet arrival time of packet "8" and the packet arrival time of packet "9".

Using the table of packet arrival time data of FIG. 17, an inter-packet interval is calculated for each inter-packet interval for each flow ID shown in FIG. 18. As indicated in FIG. 18, the inter-packet interval information is recorded for multiple flow pairs having multiple application protocols.

FIG. 19 is a table of defined inter-packet interval states (IPIS). The table of FIG. 19 has an inter-packet interval state (IPIS) column and an inter-packet interval column. The inter-packet interval state (IPIS) is a numerical reference to one of six states. The first IPIS corresponds to an inter-packet interval less than a first interval threshold value (IT1). The second IPIS corresponds to an inter-packet interval greater than or equal to the first interval threshold value (IT1) and less than a second interval threshold value (IT2). The third IPIS corresponds to an inter-packet interval greater than or equal to the second interval threshold value (IT2) and less than a third interval threshold value (IT3). The fourth IPIS corresponds to an inter-packet interval greater than or equal to the third interval threshold value (IT3) and less than a fourth interval threshold value (IT4). The fifth IPIS corresponds to an inter-packet interval greater than or equal to the fourth interval threshold value (IT4) and less than a fifth interval threshold value (IT5). The sixth IPIS corresponds to an inter-packet interval greater than or equal to the fifth interval threshold value (IT5).

FIG. 20 is a table of defined inter-packet interval threshold values. The table of FIG. 20 has an interval threshold column and a time column. In one example, the first interval threshold (IT1) is one nanosecond, the second interval threshold (IT2) is one hundred nanoseconds, the third interval threshold (IT3) is one microsecond, the fourth interval threshold (IT4) is one hundred microseconds, and the fifth interval threshold (IT5) is one second. As will be recognized by one skilled in the art, the interval thresholds listed in FIG. 20 are exemplary and can be greatly varied based upon various operating parameters and network characteristics.

FIG. 21 is a table of inter-packet interval states (IPIS). Application of the table of defined inter-packet interval states (IPIS) shown in FIG. 19 to the table of inter-packet interval information shown in FIG. 18 produces the table of inter-packet interval states (IPIS) shown in FIG. 21. For example in FIG. 18, for flow ID "1" and inter-packet interval "8→9" the corresponding cell includes inter-packet interval information of "0.5 nS" (half a nanosecond). A half a nanosecond inter-packet interval corresponds to an inter-packet interval state "1" shown in FIG. 19. Accordingly in FIG. 21, for flow ID "1" and inter-packet interval "8→9" the corresponding cell includes inter-packet interval state "IPIS=1" (inter-packet interval sate is one). Similarly in FIG. 18, for flow ID "1" and inter-packet interval "10→11" the corresponding cell includes inter-packet interval information of "90 nS" (ninety nanoseconds). A ninety nanosecond inter-packet interval corresponds to an inter-packet interval state "2" shown in FIG. 19. Accordingly in FIG. 21, for flow ID "1" and inter-packet interval "10→11" the corresponding cell includes inter-packet interval state "IPIS=2" (inter-packet interval sate is two). As indicated in FIG. 21, the packet size state is recorded for multiple flow pairs having multiple application protocols.

FIG. 22 is an inter-packet interval prediction table for a HTML application protocol. An inter-packet interval (IPI) table is a temporal signature unique to each application protocol. The table of FIG. 22 includes an inter-packet interval state (IPIS) of packet(n) column, an IPIS of packet(n+1) column, and IPIS a plurality of transition (IPIST) columns for each sequential inter-packet interval between packet number "8" and packet number "50". In FIG. 22, the variable n represents the first packet number listed in a IPIST column. Each IPIST column includes a count of IPIST between packet(n) and packet(n+1).

For example (Example A in FIG. 22) if packet "8" of a flow pair has an inter-packet interval state of one, then the greatest count value of each inter-packet interval state transition with packet(n)="1" and IPIST="8→9" is determined. As shown in FIG. 22, for packet(n)="1" and packet(n+1)="1" the IPIST count is "10", for packet(n)="1" and packet(n+1)="2" the IPIST count is "15", for packet(n)="1" and packet(n+1)="3" the IPIST count is "20", for packet(n)="1" and packet(n+1)="4" the IPIST count is "30", for packet(n)="1" and packet(n+1)="5" the IPIST count is "15", and for packet(n)="1" and packet(n+1)="6" the IPIST count is "25". The greatest IPIST count value is "30", therefore it is predicted that the inter-packet interval between the packet arrival time of packet number "8" and packet number "9" is inter-packet interval state (IPIS) four (IT3<IPI<IT4).

For example (Example B in FIG. 22) if packet "47" of a flow pair has an inter-packet interval state of four, then the greatest count value of each inter-packet interval state transition with packet(n)="4" and IPIST="47→48" is determined. As shown in FIG. 22, for packet(n)="4" and packet(n+1)="1" the IPIST count is "90", for packet(n)="4" and packet(n+1)="2" the IPIST count is "20", for packet(n)="4" and packet(n+1)="3" the IPIST count is "600", for packet(n)="4" and packet(n+1)="4" the IPIST count is "10", for packet(n)="4" and packet(n+1)="5" the IPIST count is "50", and for packet(n)="4" and packet(n+1)="6" the IPIST count is "78". The greatest IPIST count value is "600", therefore it is predicted that the inter-packet interval between the packet arrival time of packet number "47" and packet number "48" is inter-packet interval state (IPIS) three (IT2≤IPI<IT3).

In one example, a first plurality of flow pairs having a Hyper Text Markup Language (HTML) application protocol and a second plurality of flow pairs having a Standard Mail Transfer Protocol (SMTP) application protocol are processed by FPD 34. As described above, a first inter-packet interval prediction table will be generated for the HTML application protocol and a second inter-packet interval prediction table will be generated for the SMTP application protocol.

Figure 23:
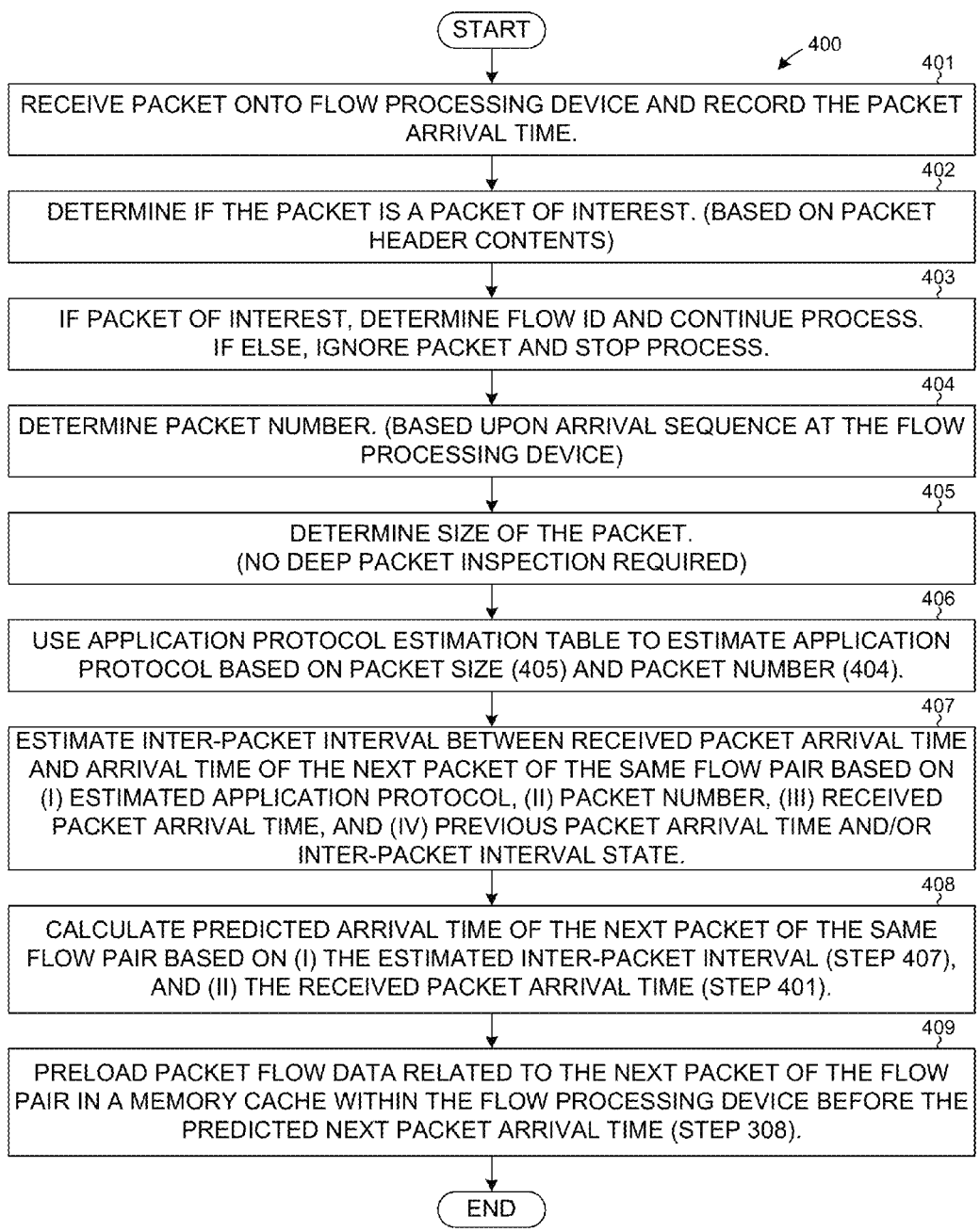
FIG. 23 is a flowchart of the predictive caching operating phase.

FIG. 23 is a predictive caching operating flowchart 400. In Step 401, a packet is received onto a flow processing device and the packet arrival time is recorded. Then it is determined if the packet is a packet of interest (Step 402). In one example, the determination of Step 402 is performed by analyzing the contents of the header of the packet. If the packet is a packet of interest, then a flow ID is determined (Step 403). If the packet is not a packet of interest then the process is aborted and the flow ends. In Step 404, a packet number is determined. In one example, the packet number is based upon the sequence in which the packet was received by the flow processing device. In another example, the packet number is based upon the sequence in which the packet was transmitted. The packet size is then determined without deep packet inspection (DPI) (Step 405). In Step 406, the application protocol estimation table is used to estimate the application protocol based on the packet size determined in Step 405 and the packet number determined in Step 404. The inter-packet interval is estimated between the received packet and the next packet to be received of the same flow pair based on (i) the estimated application protocol, (ii) the packet number, (iii) the packet arrival time of the received packet, and (iv) the previous inter-packet interval state and or previous packet arrival time (Step 407). In Step 408, The predicted arrival time of the next packet of the same flow pair is calculated based on (i) the estimated inter-packet interval from step 407, and (ii) the received packet arrival time from step 401. Lastly, a packet flow data related to the next packet of the flow pair is preloaded in a memory cache within the flow processing device before the predicted next packet arrival time from step 408 (Step 409).

FIG. 24 is an application protocol estimation operation table. The table of FIG. 24 has a flow identification (ID) column, an estimated application protocol column, and seven packet size state columns. During operation, new flow pairs are communicated to a flow processing device. Each new flow pair is assigned a flow ID. The packet size of the first seven packets of the new flow pair are recorded in the application protocol estimation operation table. Once the seventh packet size has been recorded, the application protocol estimation table of FIG. 16 is used to estimate the application protocol of the new flow pair. Using the application protocol estimation table has the benefit of avoid deep packet inspection which requires a great amount of time and processing power. The application protocol estimation table provides a determination of the application protocol in an expedient manner that allows time to predict when the next packet of the same flow pair will arrive and to preload packet flow data in a local cache memory within a flow processing device before the next packet arrives. The estimated application protocol is recorded in the corresponding cell in the estimated application protocol column. In one example, the packet size state information is purged from memory one the estimated application protocol has been determined. As shown in FIG. 24, an estimated application protocol is recorded for each flow pair received. In one example, an estimated application protocol may only be determined and recorded for a limited group of application protocols.

FIG. 25 is an inter-packet interval prediction operation table. The table of FIG. 25 has a flow identification (ID) column, an estimated application protocol column, a packet number (n−1) column, an arrival time (n−1) column, an IPIS (n−1) column, a packet number (n), and a arrival time (n) column. The flow ID column lists a numerical representation of a flow pair. The estimated application protocol column lists the application protocol estimated and recorded in FIG. 24. Packet number (n−1) is the packet number of the packet received before the most recently received packet number (n). Arrival time (n−1) is the time when packet number (n−1) arrived. IPIS (N−1) is the inter-packet interval state of the inter-packet interval between packet number (n−1) and packet number (n). Arrival time(n) is the packet arrival time of the last received packet number.

During operation the appropriate inter-packet interval prediction table is selected based upon the estimated application protocol. The packet arrival time of packet number (n−1) and the packet arrival time of packet number (n) are used to calculate the inter-packet interval state the represents the inter-packet interval between the arrival time of packet number (n−1) and the packet arrival time of packet number (n). Once the IPIS is determined, the appropriate inter-packet interval prediction table is used to predict the inter-packet interval state that will occur before the next packet of the same flow pair is received. The predicted inter-packet interval state is used to preload a packet flow data in local cache memory within a flow processing device.

Figure 26:
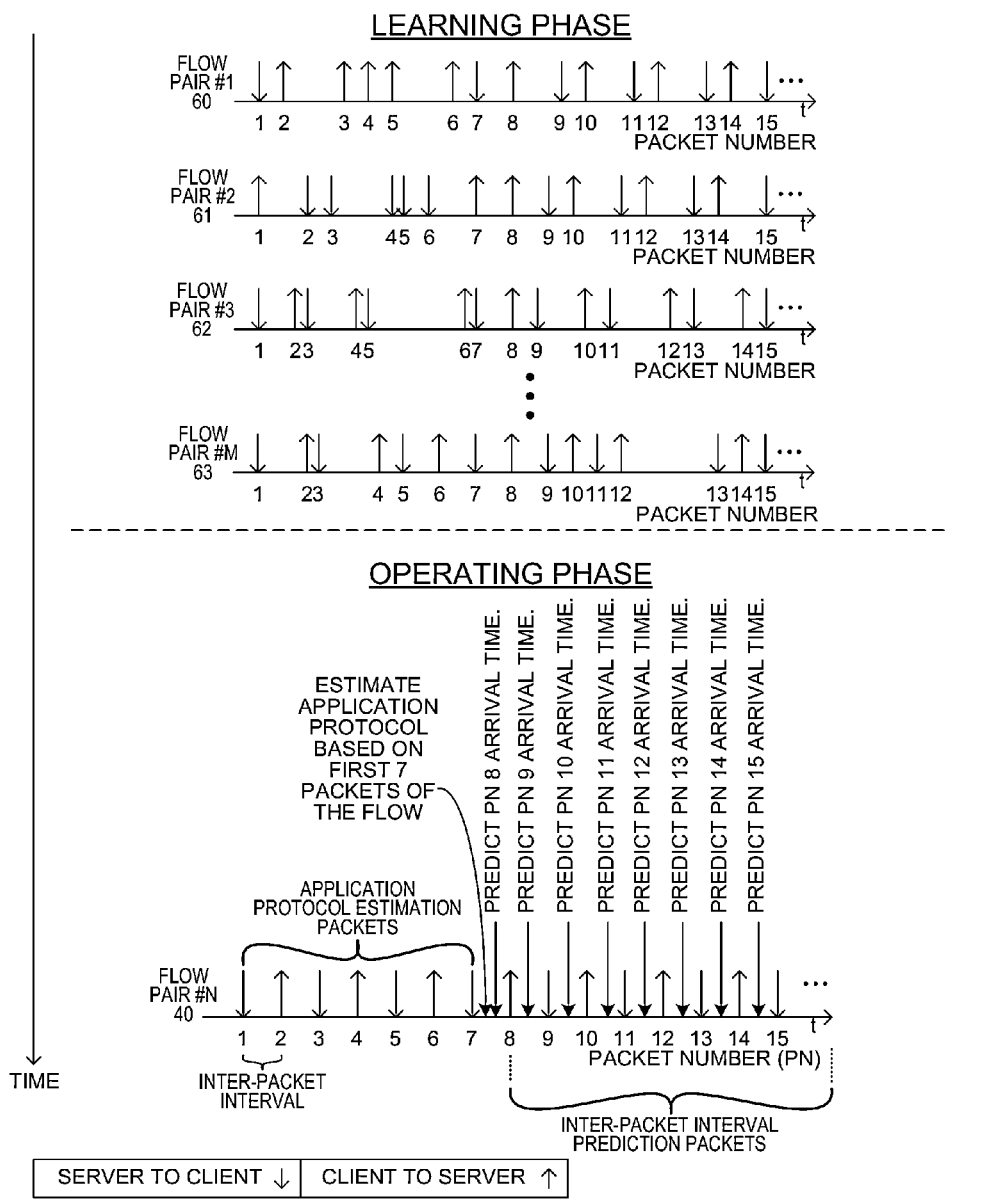
FIG. 26 is a packet diagram of the learning phase and the operating phase.

FIG. 26 is a learning and operating phase packet diagram. As discussed above, flow pairs 60-63 are received. A first plurality of packets from a first plurality of flow pairs having the same application protocol are designated as application protocol learning packets. A second plurality of packets from the first plurality of flow pairs having the same application protocol are designated as inter-packet interval learning packets. The learning packets are used to generate an application protocol estimation table. The learning packets are also used to generate inter-packet interval predication tables for each application protocol. Once the application protocol estimation table and inter-packet interval prediction tables are generates, the learning phase ends and transitions to the operating phase. In the operating phase a new flow pair 40 is received. The first seven packets of the new flow pair 40 are used to estimate the application protocol using the application protocol estimation table. Once an estimated application protocol is determined, a corresponding inter-packet interval prediction table is used to predict the inter-packet interval before the next packet of the flow pair 40 will be received. The inter-packet interval prediction is performed after each packet of the flow pair 40 is received.

Figure 27:
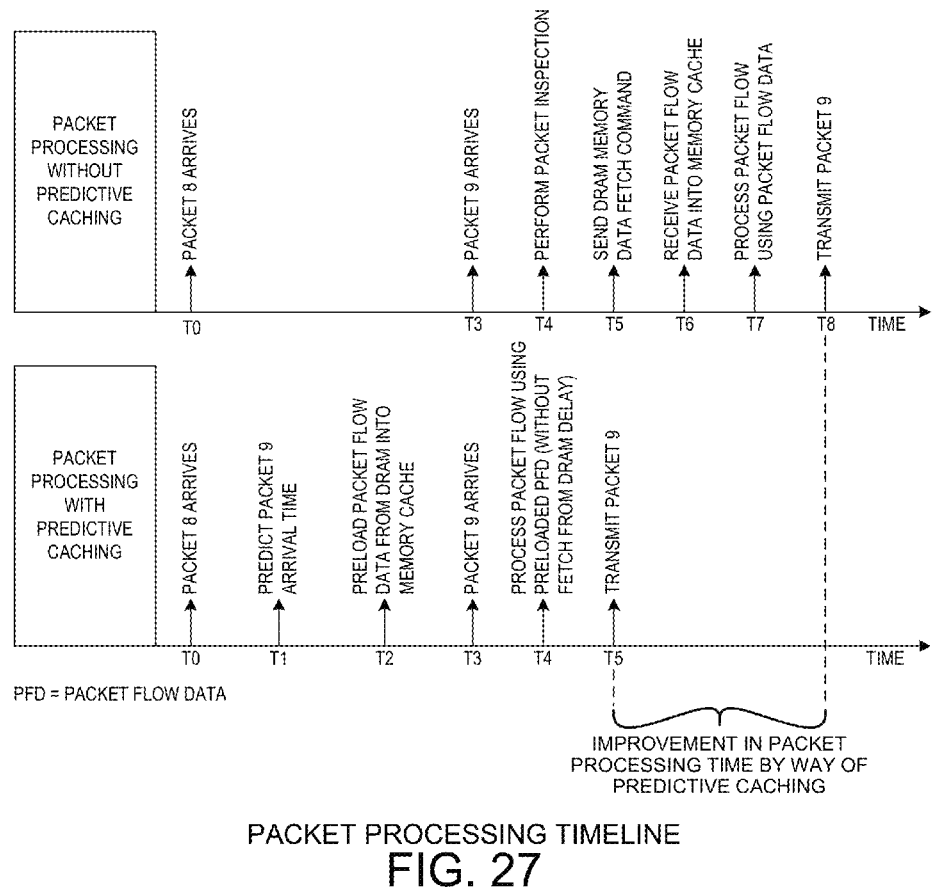
FIG. 27 is a diagram of a packet processing timeline.

FIG. 27 is a packet processing timeline. Two timelines are illustrated in FIG. 27. The first timeline illustrates packet processing without predictive caching. At time T0 packet (n) arrives. At time T3 packet (n+1) arrives. Then packet inspection is performed (T4). At time T5 a fetch command is sent to external DRAM memory and data is received from external DRAM memory and preloaded in local memory cache at time T6. Then packet (n+1) is then processed at time T7. Finally, at time T8 packet (n+1) is transmitted. The second timeline illustrates packet processing with predictive caching. At time T0 packet (n) arrives. At time T1 arrival time of packet number "8" is predicted. Then packet flow data related to packet number "9" is preloaded in local cache memory in the flow processing device. At time T3 packet number "9" arrives. Packet number "9" is then immediately processed without any fetch from external DRAM memory delay (T4). Then at time T5 packet number "9" is transmitted. The improvement in packet processing time for a single packet by way of predictive caching is calculated by subtracting time T5 from time T8. The benefits of the improvement in packet processing time is multiplied by the number of packet processed with improved packet processing time.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

The invention claimed is:

1. A method of generating an application protocol estimation information, comprising:
 (a) receiving a first packet and a second packet onto an appliance wherein the first and second packets are part of a flow pair;
 (b) determining an application protocol of the first and second packets;
 (c) determining a first packet size of the first packet and a second packet size of the second packet;
 (d) converting the packet sizes of (b) into a first and second packet size state;
 (e) determining a packet size state transition between the first packet and the second packet;
 (f) determining a most likely application protocol (MLAP) for the packet size state transition between the first and second packet;
 (g) calculating a probability that the MLAP of (f) is the application protocol of the flow pair; and
 (h) storing the MLAP of (g) and the probability of (g) in the application protocol estimation table.

2. The method of claim 1, wherein the determining of (b) is performed by a deep packet inspection (DPI), and wherein there are six packet size states.

3. The method of claim 1, wherein the determining of (b) further comprises:
 (b1) determining a first packet flow direction of the first packet; and
 (b2) determining a second packet flow direction of the second packet.

4. The method of claim 1, further comprising:
 (i) incrementing a count of the packet size state transition between the first packet and the second packet.

5. The method of claim 1, wherein the application protocol estimation table includes a first, a second, and a third packet size transition from the flow pair.

6. The method of claim 1, wherein the application protocol estimation table includes a plurality of packet size transitions from at least twenty five flow pairs.

7. A method of generating an inter-packet interval prediction table, comprising:
 (a) receiving a first packet and a second packet onto an appliance wherein the first and second packets are part of a flow pair;
 (b) determining an application protocol of the first and second packets;
 (c) determining a first packet arrival time for the first packet and a second packet arrival time for the second packet;
 (d) calculating an inter-packet interval between the packet arrival time of the first packet and the packet arrival time of the second packet;
 (e) converting the inter-packet interval calculated in (d) into an inter-packet interval state;
 (f) determining a most likely application protocol (MLAP) for the inter-packet interval state;
 (g) calculating a probability that the MLAP of (f) is the application protocol of the flow pair; and
 (h) storing the MLAP of (g) and the probability of (g) in the application protocol estimation table.

8. The method of claim 7, wherein the determining of (b) is performed by a deep packet inspection (DPI).

9. The method of claim 7, further comprising:
 (i) incrementing a count of the inter-packet interval state for the inter-packet interval between the first packet and the second packet; and
 (j) storing the incremented count of (f) in the inter-packet interval prediction table.

10. The method of claim 7, wherein the first packet and the second packet are sequentially received by the appliance.

11. The method of claim 7, wherein the inter-packet interval state represents a range of inter-packet intervals.

12. The method of claim 7, wherein there are six inter-packet interval states.

13. The method of claim 7, wherein the first packet and the second packet have the same application protocol.

14. The method of claim 7, wherein the inter-packet interval table is based on a first plurality of packets having a first application protocol, and wherein a second inter-packet interval table is based on a second plurality of packets having a second application protocol.

15. The method of claim 7, wherein the inter-packet interval table includes at least twenty five inter-packet interval states for the flow pair.

16. The method of claim 7, wherein the inter-packet interval table includes a count of inter-packet interval states from at least fifty pairs of packet flows.

* * * * *